US010861338B2

(12) United States Patent
Nix

(10) Patent No.: US 10,861,338 B2
(45) Date of Patent: Dec. 8, 2020

(54) SYSTEMS AND METHODS FOR DRIVER ASSISTANCE

(71) Applicant: Harman International Industries, Incorporated, Stamford, CT (US)

(72) Inventor: Axel Nix, Birmingham, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 29 days.

(21) Appl. No.: 16/097,561

(22) PCT Filed: May 5, 2016

(86) PCT No.: PCT/US2016/031057
§ 371 (c)(1),
(2) Date: Oct. 29, 2018

(87) PCT Pub. No.: WO2017/192144
PCT Pub. Date: Nov. 9, 2017

(65) Prior Publication Data
US 2019/0164430 A1 May 30, 2019

(51) Int. Cl.
*H04N 13/111* (2018.01)
*B60R 11/00* (2006.01)
(Continued)

(52) U.S. Cl.
CPC ............... *G08G 1/166* (2013.01); *B60R 1/00* (2013.01); *B60R 1/002* (2013.01); *B60R 11/00* (2013.01);
(Continued)

(58) Field of Classification Search
CPC ............................. G08G 1/166; H04N 5/265
See application file for complete search history.

(56) References Cited

U.S. PATENT DOCUMENTS 7,161,616 B1 * 1/2007 Okamoto ............. G06T 3/4038
348/148
8,134,594 B2 * 3/2012 Nagamine ............ B60W 40/02
348/149
(Continued)

FOREIGN PATENT DOCUMENTS

WO 2010099416 A1 9/2010

OTHER PUBLICATIONS

ISA European Patent Office, International Search Report Issued in Application No. PCT/US2016/031057, dated Feb. 7, 2017, WIPO, 4 pages.

*Primary Examiner* — Irfan Habib
(74) *Attorney, Agent, or Firm* — McCoy Russell LLP

(57) ABSTRACT

Systems and method for a driver assistance system including a surround view system are provided. In an example method for automatically selecting a virtual camera position in the surround view system, the method includes selecting one of the one or more vehicle surrounding the host vehicle as a threat vehicle based on at least one of a geographic position, and a velocity of the vehicle relative to one or more of a position, a heading, and a speed of the host vehicle. Based on the selected threat vehicle, the method includes selecting a virtual camera position such that the threat vehicle and a portion of the host vehicle are in view of a virtual camera, and displaying an image from the virtual camera position to a driver of the host vehicle.

18 Claims, 13 Drawing Sheets

(51) Int. Cl.
  *B60R 11/04* (2006.01)
  *G08G 1/16* (2006.01)
  *B60R 1/00* (2006.01)
  *H04N 5/247* (2006.01)
  *H04N 5/265* (2006.01)

(52) U.S. Cl.
  CPC ............. *B60R 11/04* (2013.01); *G08G 1/163* (2013.01); *H04N 5/247* (2013.01); *H04N 5/265* (2013.01); *H04N 13/111* (2018.05); *B60R 2011/004* (2013.01); *B60R 2300/102* (2013.01); *B60R 2300/105* (2013.01); *B60R 2300/302* (2013.01); *B60R 2300/303* (2013.01); *B60R 2300/50* (2013.01); *B60R 2300/605* (2013.01)

(56) References Cited

U.S. PATENT DOCUMENTS

| | | | |
|---|---|---|---|
| 8,363,103 B2 * | 1/2013 | Ichinose | G06T 3/4038 348/148 |
| 8,462,210 B2 * | 6/2013 | Katoh | B60R 1/00 348/148 |
| 8,866,905 B2 * | 10/2014 | Yamamoto | B60R 1/00 348/148 |
| 8,953,011 B2 * | 2/2015 | Lang | B60R 1/00 348/36 |
| 9,036,026 B2 | 5/2015 | Dellantoni et al. | |
| 9,232,195 B2 * | 1/2016 | Lang | B60R 1/00 |
| 9,667,922 B2 * | 5/2017 | Lang | B60R 1/00 |
| 9,707,891 B2 * | 7/2017 | Lang | B60R 1/00 |
| 9,715,015 B2 * | 7/2017 | Izumikawa | G01S 17/89 |
| 9,922,466 B2 * | 3/2018 | Donnelly | B60R 1/00 |
| 10,095,935 B2 * | 10/2018 | Gupta | G06K 9/00369 |
| 10,186,039 B2 * | 1/2019 | Choi | G06T 7/13 |
| 10,290,080 B2 * | 5/2019 | Esparza Garcia | G06T 15/503 |
| 10,315,566 B2 * | 6/2019 | Choi | G02B 27/0101 |
| 2008/0246843 A1 * | 10/2008 | Nagata | B60R 1/00 348/148 |
| 2008/0306666 A1 * | 12/2008 | Zeng | B60Q 9/006 701/70 |
| 2011/0026771 A1 * | 2/2011 | Hsu | G06K 9/00805 382/104 |
| 2013/0033602 A1 | 2/2013 | Quast et al. | |
| 2014/0139676 A1 * | 5/2014 | Wierich | H04N 5/23296 348/148 |
| 2015/0264321 A1 | 9/2015 | Dellantoni et al. | |
| 2016/0042238 A1 | 2/2016 | Lynam et al. | |
| 2018/0040103 A1 * | 2/2018 | Esparza Garcia | G06T 15/503 |

* cited by examiner

SYSTEMS AND METHODS FOR DRIVER ASSISTANCE

CROSS REFERENCE TO RELATED APPLICATIONS

The present application is a U.S. National Phase of International Patent Application Serial No. PCT/US2016/031057, entitled "SYSTEMS AND METHODS FOR DRIVER ASSISTANCE," filed on May 5, 2016. The entire contents of the above-identified application are hereby incorporated by reference for all purposes.

FIELD

The disclosure relates to the field of driver assistance system, and in particular to driver assistance system including surround view system operable to perform automatic adjustment of a surround view of a vehicle based on driving situations.

BACKGROUND

Driver assistance may include any relief that is provided to an individual associated with a vehicle with the aim of increasing individual protection and enhancing driver experience. Driver assistance systems may include surround view systems capable of generating a three-dimensional or surround view of a surrounding of the vehicle through multiple cameras that are positioned around the vehicle. Typically, the surround view systems may stitch together images from the multiple cameras and generate the surround view from a virtual camera position. As such, the surround view derived from the virtual camera position may be presented to the driver. Providing the view from the virtual camera position is particularly useful in situations where the driver's view may be obstructed, while the surround or virtual view may not be obstructed. As an example, the surround view systems may show a top view (bird's eye view) next to a single camera view (e.g. rear view) to aid in parking the vehicle. Overall, driver assistance systems including surround view systems may be configured to enhance a driver's spatial awareness by providing detailed information about the vehicle's environment that may not be apparent to the driver.

SUMMARY

Methods of performing vehicle or driver assistance in a vehicle are disclosed. An example method for automatically selecting a virtual camera position in a three-dimensional surround view includes receiving a geographic position of other vehicles surrounding a host vehicle, selecting one of the other vehicles as a relevant threat vehicle based on at least one of a position, a heading, and a speed of the host vehicle relative to the geographic position of the other vehicles, selecting a virtual camera position such that the relevant threat vehicle and a portion of the host vehicle are in view of the virtual camera, and displaying an image from the virtual camera positon to a driver of the host vehicle Embodiments are also disclosed for an example surround view systems. A first example of the surround view system for a host vehicle includes a front camera, a left side camera, a right side camera, a rear camera, a display, a positioning sensor, and an image processing device operatively connected to the cameras and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the positioning sensor.

A second example of surround view system for a host vehicle includes one or more cameras, a display, an object detection sensor, and an image processing device operatively connected to the one or more cameras, the object detection sensor and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the object detection sensor.

A third example of the surround view system includes one or more cameras, a display, a radio receiver, and an image processing device operatively connected to the one or more cameras, the radio receiver and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the radio receiver.

It is to be understood that the features mentioned above and those to be explained below can be used not only in the respective combinations indicated, but also in other combinations or in isolation. These and other objects, features, and advantages of the disclosure will become apparent in light of the detailed description of the embodiment thereof, as illustrated in the accompanying drawings.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
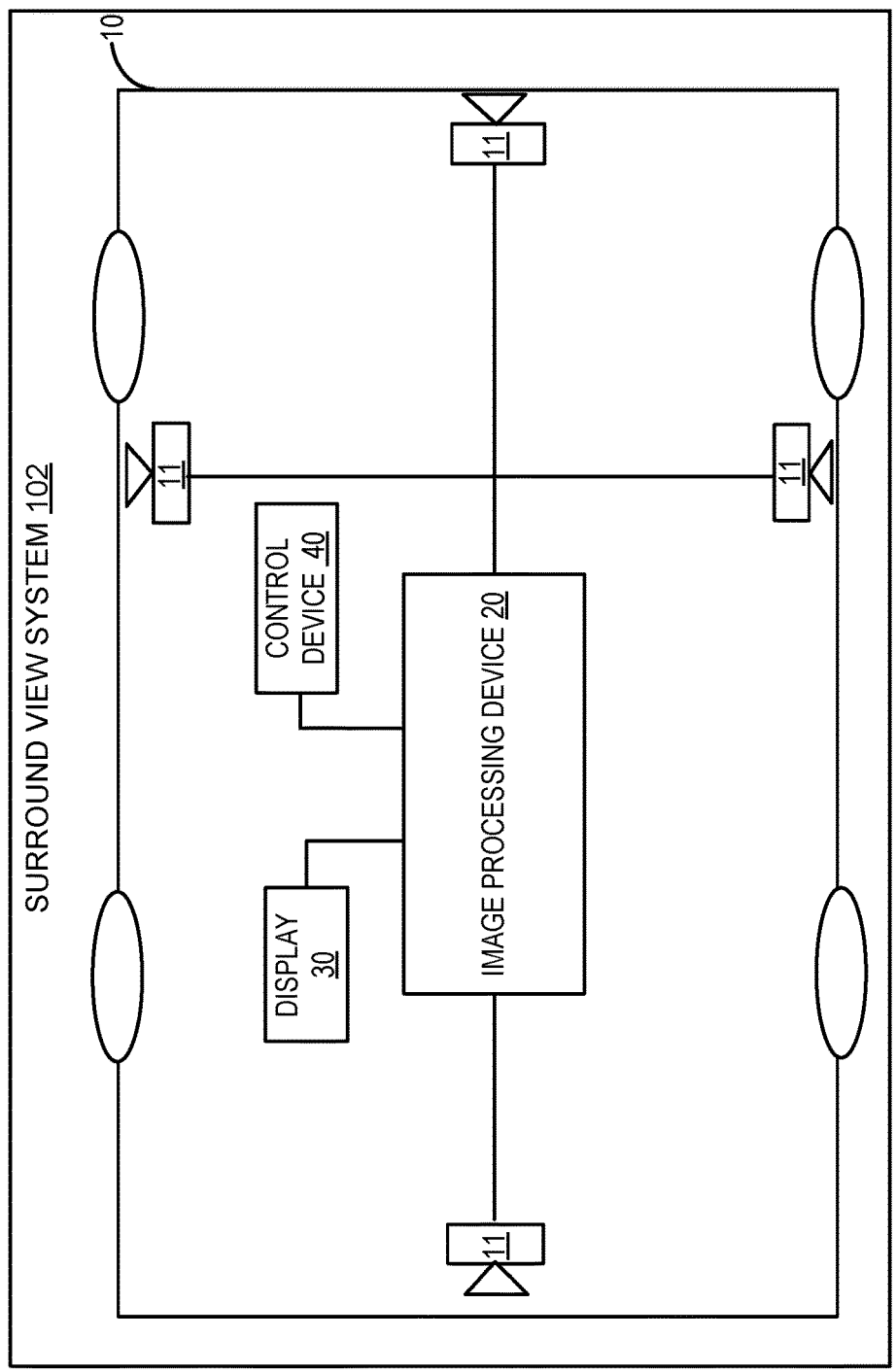
FIG. 1 shows an example surround view system of a host vehicle capable of generating a surround view of a surrounding of the host vehicle in accordance with one or more embodiments of the present disclosure.

As described above, vehicles may be configured with surround view systems capable of generating surround views of the vehicle's surrounding. The surround view may be generated by stitching together a birds-eye view of the vehicle along with an image of the vehicle and the surrounding and may be presented to a driver via a display. The present disclosure describes a system that provides an enhanced three-dimensional surround view system which automatically selects a virtual camera position that is most relevant to a given driving situation. The system may be capable of generating and adjusting the surround view of a surrounding of the vehicle based on inputs received from one or more of a positioning sensor, an object detection sensor, and a radio receiver. The view from the virtual camera position is useful in situations where the driver's view may be obstructed. For example, when entering an intersection, the driver's view may be obstructed by parked vehicles and/or trees. However, a virtual view that utilizes a front camera which is located approximately 2 meters in front of the driver at the front bumper, is not obstructed. Thus, the driver may be able to visualize vehicles/objects that were otherwise hidden from the driver's view and the spatial awareness of the driver may be increased. The present disclosure also describes a system that determines a likely driving scenario based on inputs from one or more of the driver assistance systems and a driver input. Based on the driving scenario, the system may automatically select a virtual camera position and view direction. Further, the driver may use an input device to include preferred views, and to overrule preselected views, for example.

The virtual camera position may be placed such that a portion of the host vehicle appears in the image that is presented to the driver, providing an intuitive way for the viewer to gain spatial awareness and interpret the content of the image by providing the reference view of the host vehicle. As an example, when the virtual camera position is in the right/forward quadrant, facing left, the image may show a perspective right side view of a rendered 3D host vehicle model, blended with live video from the front camera, and possibly stitched therewith the left side camera live video. The virtual camera position may be at about the height of the driver's eyes. Where available, the system may utilize the inputs from a vehicle-to-vehicle (V2V) communication system to determine a suitable virtual camera position to provide a view in the direction of the most imminent threat. The V2V information may in particular comprise basic safety messages that contain latitude, longitude, heading, and speed information of vehicles within the surroundings of the host vehicle. The view selector may assign a threat score for each vehicle identified by a basic safety message, thereby identifying the likelihood of a collision with that vehicle. The view selector may also, based on the geographic position of the threat relative to the position and heading of the host vehicle, identify a suitable virtual camera position pointing into the direction of the threat, while showing at least a portion of the host vehicle to provide intuitive situational awareness.

FIG. 1 shows a schematic view 100 of an example surround view system 102 that is described in US patent application US2013/0033602 which is incorporated herein by reference. Briefly, the surround view system 102 may be operable to project a surround view inversely onto a bowl-shaped projection surrounding an object (e.g., vehicle).

In FIG. 1, a vehicle 10 includes a plurality of image sensors 11. In some examples, surround view systems may include four to six image sensors mounted around the vehicle. As a non-limiting example, four image sensors 11 are shown. The image sensors 11 may be placed symmetrically along a perimeter of the vehicle 10 facing different directions. Together, the plurality of image sensors 11 can image a 360 degree surroundings of the vehicle 10. For example, a first image sensor 11 may be placed on the front bumper, a second and a third image sensor 11 may be positioned along under each side mirror, and a fourth image sensor 11 may be placed at the rear bumper of the vehicle 10. As such, there may be sufficient overlap between regions imaged by each of the sensors 11 such that when the images from the sensors 11 are combined, a view of the entire surrounding of the vehicle 10 may be generated. As an example, the image sensors 11 may be fish-eye cameras with ultra-wide angled lenses capable of generating wide panoramic hemispherical images. As another example, the image sensors 11 may be omni-directional cameras. As yet another example, the image sensors 11 may be wide-angle rectilinear cameras.

The surround view system 102 may include an image processing device 20 capable of receiving the image data from the plurality of image sensors 11. For example, image data corresponding to the surrounding of the vehicle 10 may be captured by the plurality of image sensors 11 and passed to the image processing device 20. The received image data may be analyzed and stitched together in order to generate a surround view of the surrounding the vehicle 10. Any suitable algorithms or routines and/or combination of algorithms/routines may be utilized to analyze and generate a synthesized image of the surrounding. As such, the analysis may include any post-processing that may be applied to the image data to correct and/or remove any distortions in the image data, for example. As explained in US patent application US20130033602, the surround view may be generated by projecting the image data received from the image sensors 11 onto a bowl-shaped projection surrounding the vehicle 10. Further, the virtual surround view may be derived using a virtual camera position and using a viewing direction of the virtual camera positon. As such, the virtual camera position may be on a first horizontal ellipse that is about the bowl-shaped projection at a first height. The vehicle surroundings as viewed by from the virtual camera position may be a virtual user vehicle view. Herein, the virtual camera position may include a positon from which the vehicle surround view may be viewed in order to generate a virtual surround view. Further, the viewing direction from the virtual camera position may point towards a location on a second horizontal ellipse that is about the bowl-shaped projection at a second height, the second height being lower than the first height. The control device 40 (described in detail with reference to FIG. 2) may be operable to allow a user (manually) or a computer system (automatically) to change the virtual camera position at least in a horizontal direction and to change the viewing direction. By providing the virtual camera position on the first horizontal ellipse and by using a viewing direction directed towards the second horizontal ellipse, a virtual user view may be obtained which corresponds to the view of a real person looking at the object. For example, a view may be obtained of a simulated user inspecting a rear part of a vehicle. Also, by providing the virtual camera position on the first horizontal ellipse, the virtual user view can be changed and walking of a real person around the object can be simulated. The first horizontal ellipse provides a plane in which the virtual camera position may be located. The virtual camera position may be moved on the plane of the first horizontal ellipse to generate different virtual user views. For different virtual camera positions around the object, the virtual camera position may provide, on the first horizontal ellipse, the viewing direction directed towards the second horizontal ellipse independent of a selection of the viewing direction.

The surround view system 102 includes a display 30 on which the surround view may be displayed. The display 30 comprises any type of display capable of displaying information to the driver such as a monitor, a screen, a console, or the like. The display 30 may be a standalone display of the surround view system 102 or may be a display of an in-vehicle computing system of the vehicle, as explained later with reference to FIG. 3. For example, to help with parking the vehicle 10, a surround view of the rear of the vehicle may be displayed on the display 30. The virtual camera position may be placed in the rear of the vehicle, such that a portion of the host vehicle appears in the surround image of the rear of the vehicle that is presented to the driver, providing an intuitive way for the viewer to gain spatial awareness and interpret the content of the image by providing the reference view of the host vehicle. When a reverse gear of the vehicle is activated, the surround view of the rear of the vehicle may automatically appear on the vehicle. In another example, when parking the vehicle along a curb between two parked vehicles, the surround view may include peripheral views including portions of the front, rear and side views of the vehicle.

Figure 2:
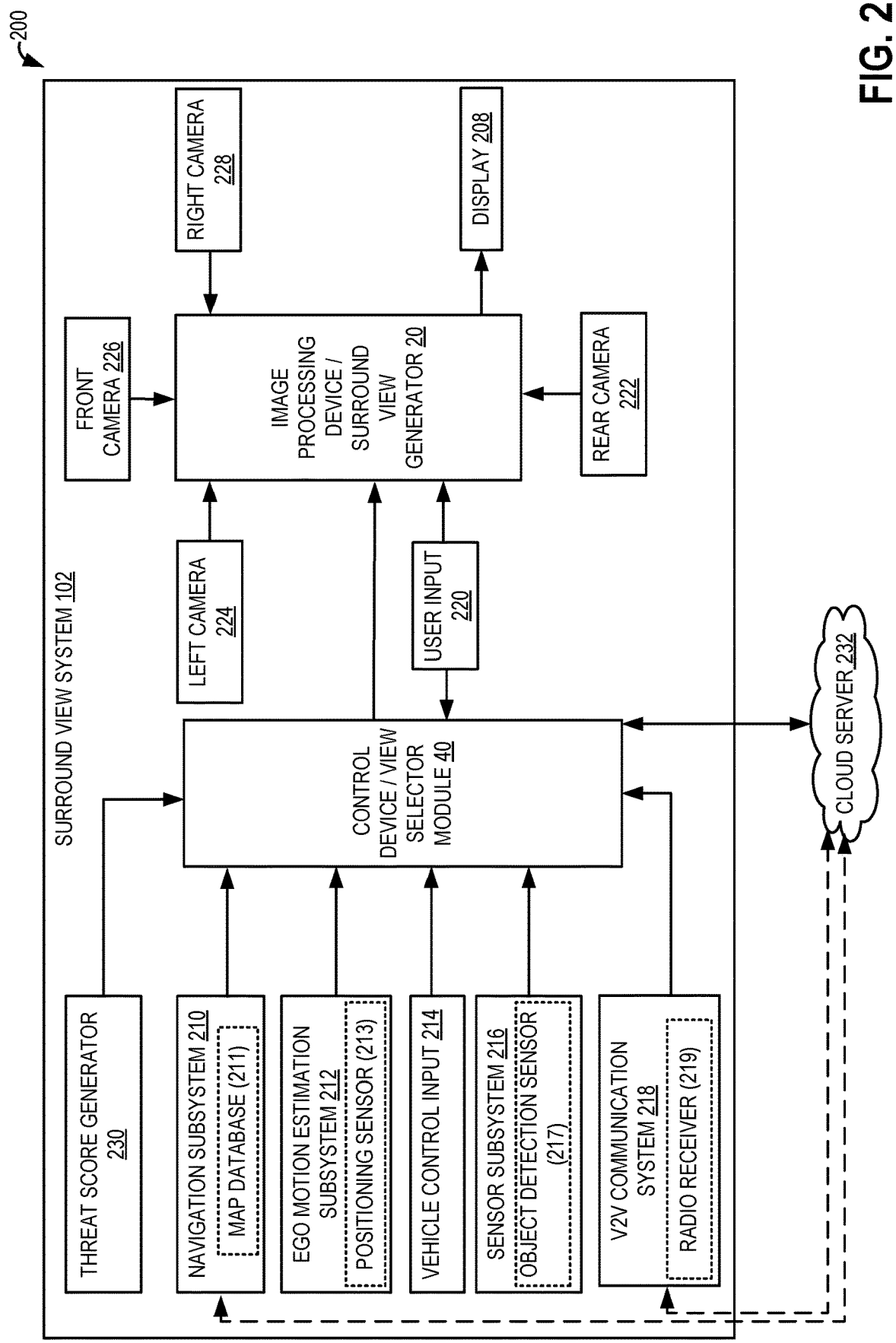
FIG. 2 shows a block diagram of the surround view system capable of adjusting a virtual view based on a driving situation, the driving situation deduced based on outputs of sensors coupled to the host vehicle in accordance with one or more embodiments of the present disclosure.

In some example embodiments, the surround view system 102 may include mechanism(s) for receiving an input from the driver (as shown in FIG. 2). As an example, the driver may be able to enter driver preferences which dictate the selection of surround view based on location, heading, and speed of the vehicle 10. The driver preferences may include, but are not limited to, a preferred viewing angle and a direction, a surround view size, and the like. However, it may be possible to automatically adjust and/or change the surround view based on driving situations, as shown in FIG. 2.

Turning now to FIG. 2, a block diagram 200 of the surround view system 102 for a host vehicle (such as vehicle 10 of FIG. 1) is shown. As shown in FIG. 1, the surround view system 102 receives image data from each of a left side camera 224, a right side camera 228, a front camera 226, and a rear camera 222. Herein, the cameras 222, 224, 226, and 228 may be examples of image sensors 11 shown in FIG. 1. As described earlier with reference to FIG. 1, the surround view system 102 may include an image processing device 20 (hereafter interchangeably referred to as a surround view generator) and a control device 40 (hereafter interchangeably referred to as a view selector module). The image processing device 20 may be operably coupled to a display 208 (such as display 30 of FIG. 1) and the cameras (222, 224, 226, and 228). As explained earlier, the cameras 222 through 228 may collectively include any one or combination of fish-eye cameras, omni-directional cameras, wide-angle rectilinear cameras, and the like. The image processing device 20 may be configured to generate a surround view of the vehicle based on the image data received from the cameras. As such, the surround view may include a view having a viewing direction from a virtual camera position; the viewing direction and the virtual camera position being selected from a plurality of virtual camera positions and viewing directions. The view thus generated may be a default view and may be displayed to a driver of the host vehicle on the display 208, for example. The virtual camera position may combine data received from one or more real cameras (parts of the virtual camera position that are in view of the real camera) with virtual reality renderings of the host vehicle (which may include portions that are in a blind spot of the real cameras). The viewing direction and the virtual camera position of the view may be selected by the image processing device in response to an output of the view selector module 40. In some examples, the view displayed via the display 208 may additionally include parking lot lane markings, curbs, traffic signs, traffic lights, pot holes, speed bumps, pedestrians, surrounding vehicles, and the like.

The view selector module 40 may determine and/or deduce the driving situation based on inputs from one or more of subsystems. As such, determining the driving situation may include determining a likely driving scenario based on the inputs received from the one or more subsystems. The one or more subsystems may be part of a driver assistance system or advanced driver assistance system, for example. The one or more subsystems may include a navigation subsystem 210, an ego motion estimation subsystem 212, and/or a sensor subsystem 216. Additionally or alternatively, the view selector module 40 may deduce the driving situation based on received vehicle control input 214 and further based on input received via vehicle-to-vehicle communication system 218. The view selector module 40 is further capable of receiving user input 220. An example driving situation may include determining that the vehicle is stopped at an intersection, with a likelihood of making a right turn. Another example of the driving situation may include determining that the vehicle is on a ramp merging on to the freeway. How the view selector module 40 determines the driving situation based on the inputs that the view selector module receives is explained below.

The surround view system 102 may include one or more processors that may execute an operating system on the surround view system 102, adjust surround view, and/or perform other operations of the surround view system. In addition, the surround view system may include a non-volatile storage device 308 configured to store data such as instructions executable by the processors in non-volatile form.

The navigation subsystem 210 of the surround view system 102 is operably coupled to the view selector module 40 and may further be configured to generate and/or receive navigation information such as location information such as latitude and longitude (e.g., via a GPS sensor and/or other sensors/cameras), route guidance, traffic information, point-of-interest (POI) identification, and/or provide other navigational services for the driver. The navigation subsystem 210 may additionally include a map database 211 that may include information about one or more of a road type, parking lot lane markings, curbs, traffic signs, traffic lights, pot holes, speed bumps and the like. As an example, the road type may include information such as single lane, double lane, one-way street, two-way street, dead-end, school zone, construction area, freeway, and the like. The road type may additionally include details about intersections, crossings, and the like. As an example, the navigation subsystem 210 may determine a location of the vehicle based on a GPS sensor. Based on the location, the navigation subsystem 210 may look up the map database 211 and determine details about the road type. For example, the navigation subsystem 210 may deduce that the vehicle is on a single lane at an intersection with a two-way street (single lane) or at a T-intersection with a two-way street or at a T-intersection with a one-way street, and the like. Additionally, the navigation subsystem 210 may determine if the vehicle is in a school-zone or construction zone or residential neighborhood based on the information stored in the map database 211.

The map database 211 may be frequently updated to include most recent information about the road constructions, detours, and the like. For example, the map database 211 may be updated by connecting to a remote server or cloud server 232 and downloading the most recent information from the cloud server 232 wirelessly and/or via Bluetooth. In an example embodiment, the map database 211 may be stored in the cloud server 232 and information may be selectively downloaded by the navigation subsystem 210 from the cloud server 232 as and when needed. As such, the surround view system 102 may further include a wireless transceiver (not shown) capable receiving and transmitting signals between the navigation subsystem 210 and the cloud server 232. The transceiver may include a transmitter and a receiver and is generally capable of transmitting and receiving signals, for example. The navigation subsystem 210 may receive the map database information stored in the cloud server 232 whenever a wireless (e.g., Bluetooth) connection exists, thereby connecting the cloud server 232 to the navigation subsystem 210. Based on the information retrieved from the map database, the view selector module may be able to adjust the surround view by providing an input to the image processing device. As such, the image processing device may be configured to generate a view having a viewing direction from a virtual camera position, the viewing direction and the virtual camera position being selected from a plurality of virtual camera positions and viewing directions. Additionally or alternatively, an image from a default view may be displayed to a driver of the host vehicle. In some examples, the viewing direction and virtual camera position of the default view may be selected by the image processing device in response to and/or based on information retrieved from the map database.

The ego motion estimation subsystem 212 of the surround view system 102 is operably coupled to the view selector module 40 and may determine the positon and orientation of the host vehicle based on the output of a positioning sensor 213, for example. Examples of positioning sensors include mechanical sensors such as accelerometers, gyroscopes, inclinometers, image sensors such as cameras, and the like.

An example of ego motion estimation would be estimating a vehicle's moving position relative to lines on the road or street signs being observed from the vehicle itself. As an example, the ego motion may include determining the position and orientation of the vehicle by analyzing the associated camera images. The ego motion estimation subsystem 212 may determine position and orientation information using sequential camera images to estimate the distance traveled. As such, the cameras may include the cameras (e.g., cameras 222 through 228) of the surround view system 102 and/or other cameras mounted on the vehicle. As another example, ego motion estimation may include analyzing data from the movement of actuators to estimate change in position over time through devices such as rotary encoders to measure wheel rotations.

Thus, the ego motion estimation subsystem 212 may receive visual input from multiple cameras mounted on the vehicle and may receive mechanical input from one or more mechanical sensors mounted on the vehicle. In addition to vision and/or mechanical input, the ego motion estimation subsystem 212 may receive input from the navigation subsystem 210 for obstacle and lane detection and may receive input from speed sensors mounted on the vehicle. As such, the ego motion estimation subsystem 212 may include algorithms and/or routines to analyze the various inputs using one or more of a global probability function, probability distribution matrices, and the like for computing the ego-motion of the vehicle relative to the road. Based on the inputs received, the ego motion estimation subsystem 212 may be able to determine driving situations such as whether vehicle is moving slowly forward, or stopped, and the like.

Thus, in response to an output of the positioning sensor, the view selector module may be able to adjust the surround view by providing an input to the image processing device. As such, the image processing device may be configured to generate a view having a viewing direction from a virtual camera position, the viewing direction and the virtual camera position being selected from a plurality of virtual camera positions and viewing directions. In such an example, an image from a default view may be displayed to a driver of the host vehicle, and the viewing direction and virtual camera position of the default view may be selected by the image processing device in response to an output of the positioning sensor.

The surround view system 102 may additionally include a sensor subsystem 216 operably coupled to the view selector module 40. As such, the sensor subsystem 216 may include object detection sensor 217 such as radar sensors, lidar/ladar sensors, ultrasonic sensors, and the like. As an example, a radar sensor mounted on the vehicle, may be able to determine a speed of one or more vehicles in the vicinity of the vehicles. A lidar sensor mounted on the vehicle may, for example, be able to determine a heading and a distance of one or more vehicles and/or objects in the vicinity of the vehicle. For example, based on the outputs of the object detection sensor 217 (such as radar and lidar sensors) the sensor subsystem 216 may be able to determine a position/location, a speed, and a heading of the other vehicles in the vicinity of the host vehicle.

As such, the sensor subsystem 216 may estimate a distance between the vehicle and any vehicles or objects in the vicinity of the vehicle by measuring the delay associated with reception of a reflected signal from the other vehicles/objects. Typically, radar sensors use 76.5 GHz radar, and the time taken for the signal to be received back by the sensor gives an estimate of the distance of the object from the sensor. In some cases, a modulated frequency is sent and received by the sensor, a difference in the frequency can be used to directly determine the distance as well as the relative speed of the object.

Lidar sensors uses emitted light for ranging applications for generating real-time three-dimensional data. As such, lidars include remote-sensing technology that measures and maps the distance to objects/vehicles, as well as other property characteristics of objects in its path. Lidar essentially maps its surroundings by illuminating the objects with laser light and then analyzing that light to create a digital image. A lidar sensor mounted on the front of the vehicle, like the bumper, is used to monitor the distance between that vehicle and any vehicle/object in front. The lidar sensor output may be used to determine if the vehicle in front slows down or gets too close, for example.

As an example, the sensor subsystem 216 may be able to detect a vehicle within 10 meters in the path of the vehicle, based on the data received from sensors (such as radar, lidar sensors) mounted on the vehicle. In response to the information received about a vehicle within 10 meters in the path, the view selector module 40 may control the surround view generator 20 such that the surround view includes the vehicle in the path, for example.

Thus, in response to an output of the object detection sensor, the view selector module may be able to adjust the surround view by providing an input to the image processing device. As such, the image processing device may be configured to generate a view having a viewing direction from a virtual camera position, the viewing direction and the virtual camera position being selected from a plurality of virtual camera positions and viewing directions. Additionally or alternatively, an image from a default view may be displayed to a driver of the host vehicle, and the viewing direction and virtual camera position of the default view may be selected by the image processing device in response to an output of the object detection sensor.

The surround view system 102 may additionally include a vehicle control input 214 operably coupled to the view selector module 40. Vehicle control input 214 may include vehicle inputs related to the engine and/or auxiliary elements within a cabin of the vehicle, such as steering wheel controls (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc.

As an example, vehicle control input 214 may include a position of a turn-signal stalk (up or down, for example), indicating an impending turn of the vehicle. In one example, when the turn-signal stalk is pushed down, a right turn may be indicated, and when the turn signal stalk is pushed down, a left turn may be indicated. In other example, pushing a button on a steering wheel of the vehicle, may indicate a left or a right turn. Based on the vehicle control input 214, the view selector module 40 may anticipate a turn of the vehicle, and may further provide feedback to the surround view generator 20 to adjust the position of the virtual surround view towards a left side of the vehicle, for example.

Thus, based on a vehicle control input, the view selector module may be able to adjust the surround view by providing an input to the image processing device. As such, the image processing device may be configured to generate a view having a viewing direction from a virtual camera position, the viewing direction and the virtual camera position being selected from a plurality of virtual camera positions and viewing directions. Additionally or alternatively, an image from a default view may be displayed to a driver of the host vehicle, and the viewing direction and virtual camera position of the default view may be selected by the image processing device in response to the output of the vehicle control input.

Continuing on, the view selector module 40 may additionally receive input from the vehicle-to-vehicle (V2V) communication system 218. As such, the V2V communication system 218 include a radio receiver 219 capable of receiving information from other vehicles/in-vehicle computing systems in other vehicles via a wireless communication link (e.g., BLUETOOTH, WIFI/WIFI-direct, near-field communication, etc.). The radio receiver 219 may be a separate piece of electronic equipment, or an electronic circuit within another device. Devices that contain radio receivers may include radar equipment, two-way radios, cell phones, wireless computer networks, GPS navigation devices, satellite dishes, Bluetooth enabled devices, and/or other communication devices.

The V2V communication system 218 may additionally include a radio transmitter (not shown). In some embodiments the radio receiver 219 may be a transceiver. As such, the radio receiver 219 may broadcast information about the vehicle's location, speed, and direction to other vehicles within a threshold distance (e.g., several hundred yards). In addition, the radio receiver 219 can receive information from surrounding vehicles, even those around corners and out of sight of the host vehicle, for example.

The V2V communication system 218 may be capable of tracking the host vehicle's position and broadcast it, along with speed, direction of travel, and/or vehicle size, at a threshold rate (e.g., 10 times per second). At the same time, the V2V communication system 218 may receive data (e.g., speed, direction of travel, and/or vehicle size, and the like) from the other V2V-equipped vehicles around it. The data is then sent to the view-selector module 40 to adjust the surround view based on the location, speed and heading of the other vehicles relative to the position, speed and heading of the host vehicle, for example.

In some embodiments, V2V communication system may additionally include vehicle-to-infrastructure (V2I) modules. As such V2I modules may further receive information from infrastructure present along the route of the vehicle, such as traffic signal information (e.g., indications of when a traffic light is expected to change and/or a light changing schedule for a traffic light near the location of the vehicle).

Thus, in response to an output of the radio receiver, the view selector module may be able to adjust the surround view by providing an input to the image processing device. As such, the image processing device may be configured to generate a view having a viewing direction from a virtual camera position, the viewing direction and the virtual camera position being selected from a plurality of virtual camera positions and viewing directions. Additionally or alternatively, an image from a default view may be displayed to a driver of the host vehicle, and the viewing direction and virtual camera position of the default view may be selected by the image processing device in response to the output of the radio receiver.

As explained earlier, the driver may be able to enter driver preferences via the user input 220 which dictates the selection of surround view based on location, heading, and speed of the vehicle. The driver preference may include, but is not limited to, a preferred viewing angle and direction, a surround view size, and the like. For example, when the speed of the vehicle is in a certain range (e.g., 50-60 mph) on a freeway, the driver may prefer to have a surround view of about 50 m facing a front of the vehicle. However, when the vehicle is in a school zone, and driving below 20 mph for example, the driver may prefer to have a surround view of a smaller distance (e.g., 10 meters) including front, rear, right, and left periphery around the vehicle to be able to detect any sudden movements of children or objects surrounding the vehicle. However, under some conditions, such as a condition where there is any chance of an accident (as determined by a threat score generator 230 which will be described later), the user preferred view may be overridden.

To summarize, the view selector module 40 may determine a likely driving situation based on inputs and/or combination of inputs from one or more subsystems, vehicle control input, user input, and V2V input. Based on the determined driving situation as determined by the view selector module 40, the image processing device 20 may be able adjust the surround view of the surround view system 102. Some non-limiting example scenarios are shown in FIG. 4.

Figure 4A:
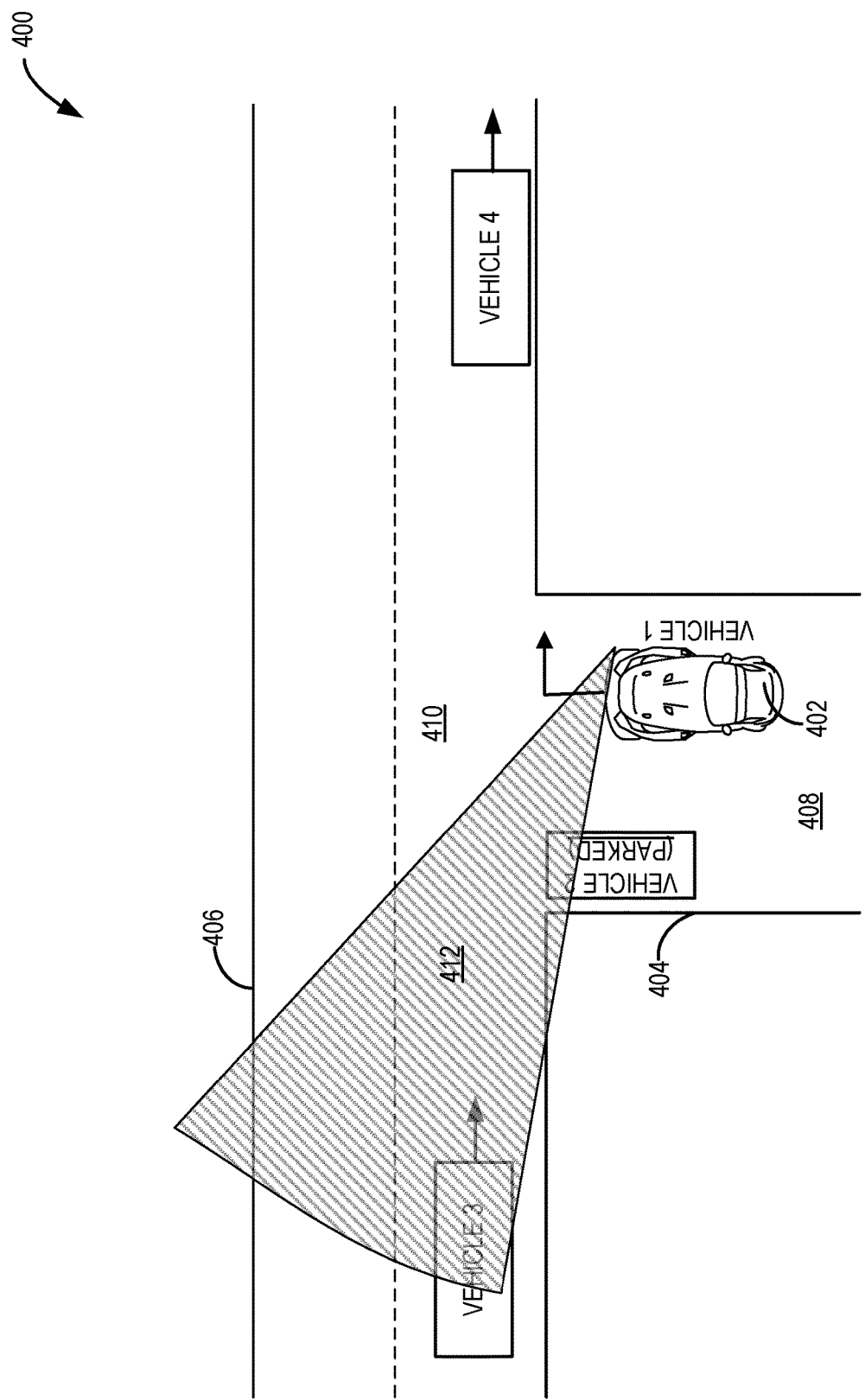
FIGS. 4A-C show example scenarios in which the virtual view surrounding the vehicle is adjusted based on driving situations and driver intentions in accordance with one or more embodiments of the present disclosure.

Turning to FIG. 4A, an example scenario 400 is shown. In scenario 400, the view selector module (such as view selector module 40 of FIG. 2) may be able to deduce that the host vehicle (vehicle 1) is travelling along a single lane road 404 and is moving towards a T-intersection of the single lane road 404 with a two-lane road 406. Herein, the view selector module may receive road and lane type information from the map database of the navigation subsystem (or from the cloud server) as explained with reference to FIG. 2. In addition, the ego motion of vehicle 1 (shown in FIG. 2) may be determined based on the output of the positioning sensor of the ego motion estimation subsystem. Thus, the view selector module may be able to determine that vehicle 1 is moving slowly forward or stopped at the intersection.

In one example, the driver's intention to make a right turn may be deduced based on the vehicle control input (e.g., a right turn signal). As such, the driver of vehicle 1 may turn on the turn signal to indicate a right turn by pushing down a turn-signal stalk, for example. In another example, based on the route data (received from the navigation system, for example), an upcoming right turn may be inferred, and based on the inference, the view selector module may deduce that vehicle 1 is about to make a right turn. In yet another example, vehicle 1 may be in a "Right Turn Only" lane, which may be detected by cameras mounted on the vehicle. Alternatively, the view selector module may be able to determine that vehicle 1 is in a "Right Turn Only" lane based on road data stored in the map database or road data received from the cloud server. Having determined that vehicle 1 is about to make a right turn, the view selector module may accordingly direct the surround view generator to generate a surround view 412 to point towards the left of the two-lane road 406. In order to generate the surround view 412, the image processing device may select the virtual camera position in the front of and to the right of the center of vehicle 1, and further adjust the viewing angle such that the viewing direction is facing left. As such, the surround view 412 may be a default view and may further be displayed to the user of vehicle 1 via the display. For example, when the virtual camera position is in the right/forward quadrant, facing left the image may show a perspective right side view of a rendered 3D host vehicle model (vehicle 1) blended with live video from the front camera and possibly stitched therewith the left side camera live video. The virtual camera position may be at about the height of the user's eyes. As described earlier, the user may overrule the preselected view at any time. For example, the user may prefer to have the surround view point to the right side of the vehicle, towards vehicle 4. The driver may input driver preferences, and may accordingly change the default surround view to point to the right, instead of pointing to the left.

Thus, the surround view system may be able to adjust the surround view of the host vehicle based on an output of the positioning sensor, and further adjust the view based on an impending right turn of vehicle 1. Without the surround view 412, the driver of vehicle 1 may not be able to clearly see vehicle 3 approaching the intersection because the view of the driver may be partially blocked by the parked vehicle 2, for example. Since the surround view includes the virtual camera position in the front of and to the right of the center of vehicle 1, the surround view 412 may not be blocked. Thus, the driver of vehicle 1 may be able to see that vehicle 3 is approaching the intersection and may cautiously make the right turn.

In a similar way, the surround view system may adjust the default view of vehicle 1, when the vehicle is about to make a left turn at a T-intersection. Having determined that vehicle 1 is about to make a left turn, the view selector module may accordingly direct the surround view generator to generate a surround view to point towards the right towards any oncoming vehicles. In order to generate the surround view, the image processing device may select the virtual camera position at left/forward quadrant of vehicle 1, and further adjust the viewing angle such that the viewing direction is facing right when vehicle 1 is at the intersection. As such, the surround view may be a default view and may further be displayed to the user of vehicle 1 via the display. However, if the vehicle is at a crossroad, and is about to make a left turn, then view selector module may accordingly direct the surround view generator to generate a surround view to point left/front towards oncoming vehicles. The image processing device may select the virtual camera position at the back of and to the left of a center of the vehicle 1, and further adjust the viewing angle such that the viewing direction is facing forward. Thus, the surround view system may be able to adjust the surround view of the host vehicle based on an output of the positioning sensor, and further adjust the view based on an impending left turn of vehicle 1.

Figure 4B:
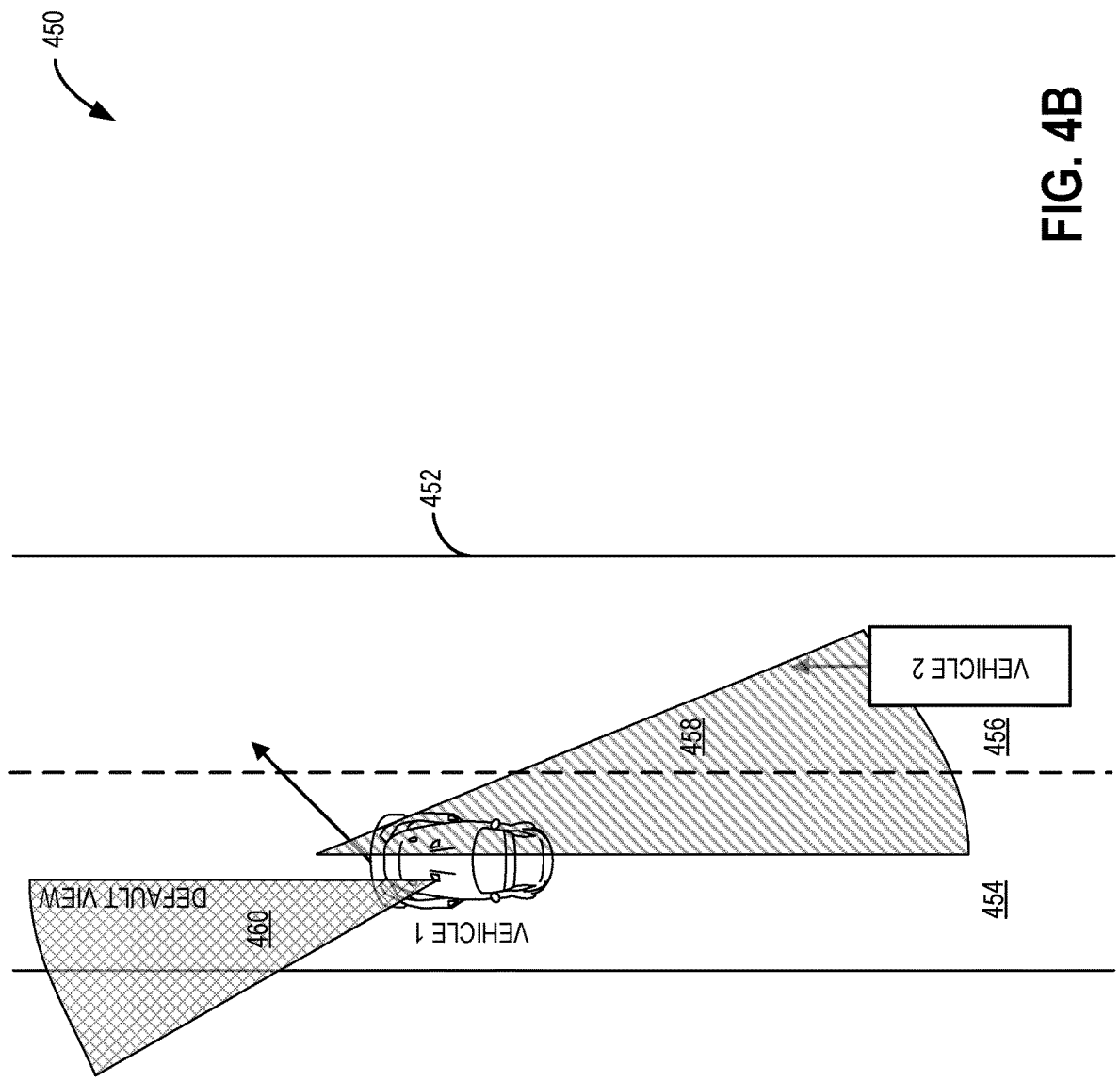

Turning to FIG. 4B, an example scenario 450 in which a surround view of a host vehicle (vehicle 1) is changed based on a driver's intention to change lanes is shown. In the example scenario 450, vehicle 1 is travelling along a left lane 454 of a two-lane road 452. Based on the driver's input for example, a default surround view 460 including a side left view may be displayed to the driver. As such, the default surround view 460 may be generated facing forward towards the left side of the vehicle by adjusting a virtual camera position and viewing angle accordingly. As such, the surround view may include an image of at least a portion of vehicle 1. The driver may be able to position vehicle 1 so as to maintain a certain distance from the left side (or curb, for example) of the road. The driver may enter driver preferences including a direction, a viewing angle, a size of the view, and the like for a certain driving speed, for example. As such, the driver may be able to change the surround view at any point (e.g., before, during, or after a surround view is displayed to the user). For example, the driver may not like the default view 460, and hence may request a different view after the default view 460 is presented. As an example, the driver of vehicle 1 may notice another vehicle up ahead on left lane 454 that is braking erratically. The driver may then wish to focus on the vehicle ahead, and hence may request the default view to be facing forward, towards the vehicle in front of vehicle 1. The driver may initiate a change in the default view by inputting the change via a display (such as display 208 of FIG. 2) in some examples. The surround view system may be able to change the surround view based on driver input and adjust the viewing angle and direction to face forward. Lidar/radar sensors of the sensor subsystem (such as sensor subsystem 216 of FIG. 2) may be able to detect the vehicle ahead of vehicle 1, and may be able to determine a distance of that vehicle from vehicle 1. Based on the calculated distance between the vehicles, the viewing area may be adjusted (e.g., automatically, based on instructions received from a processing device of the vehicle) to include the vehicle in front of vehicle 1 in the surround view.

As such, driving is made up of continuously changing scenarios and situations, and surround view system is capable of adjusting the surround view to effectively track the changing situation. In some examples, the surround view system may change the surround view based on anticipated changes in driving conditions/situations to enhance driver experience. An example scenario is described below with reference to FIG. 4B.

In scenario 450, the driver of vehicle 1 may turn on a right turn signal (by pushing down a turn-signal stalk, for example) indicating a desire to change from the left lane 454 to the right lane 456. The view selector module may determine (based on one or more of navigation data from navigation subsystem, ego motion data from ego motion estimation subsystem, and sensor data from sensor subsystem) that vehicle 1 is not at an intersection. Therefore, the view selector module may determine that the right turn signal is indicative of a desire to change lanes in this case, and not making a right turn. Futher a speed of vehicle 1 may be determined based on an output of the positioning sensor of the ego motion estimation subsystem. For example, the speed may be determined to be greater than 20 mph. Accordingly, the view selector module of the surround view system may automatically change the surround view to include regions toward the right rear of vehicle 1 including blind spots of vehicle 1. As such, blind spots exist around the vehicle and include regions surrounding the vehicle that cannot be directly observed by the driver while at the controls of the vehicle. When changing from a left lane to a right lane, a blind spot may exist towards the right rear of the vehicle, and without the surround view 458, the driver may not be able to see objects/vehicles in the blind spot. If the driver of the vehicle changes lanes without physically turning the head and checking the blind spots for example, vehicle 1 may collide with vehicle 2 in the blind spot. To mitigate such situations and increase the spatial awareness of the driver, the surround view system may automatically update the surround view based on any changes (or anticipated changes) in driving situations.

The updated surround view 458 may include an image of a portion of vehicle 1, and areas around the right side of the vehicle pointed towards the back of vehicle 1 thus covering the blind spot of vehicle 1, for example. Herein, the virtual camera position may be adjusted to be in the right/forward quadrant, facing rear. When the updated surround view 458 is displayed to the driver, the driver may be able to notice vehicle 2 in the right lane 456. As such, vehicle 2 may be in a blind spot of vehicle 1, and hence blocked from the driver of vehicle 1, however, the surround view 458 is not blocked. Thus, the automatic selection of the surround view of the vehicle gives the driver increased spatial awareness, and guides the driver into making decision of when and where to change lanes that would in turn reduce the likelihood of collision. In some example embodiments, the surround view system may be able to issue warning signals (in the form of audio and/or visual signals) to the driver if vehicle 2 is too close to vehicle 1, thereby averting a collision of vehicle 1 with vehicle 2.

Figure 4C:
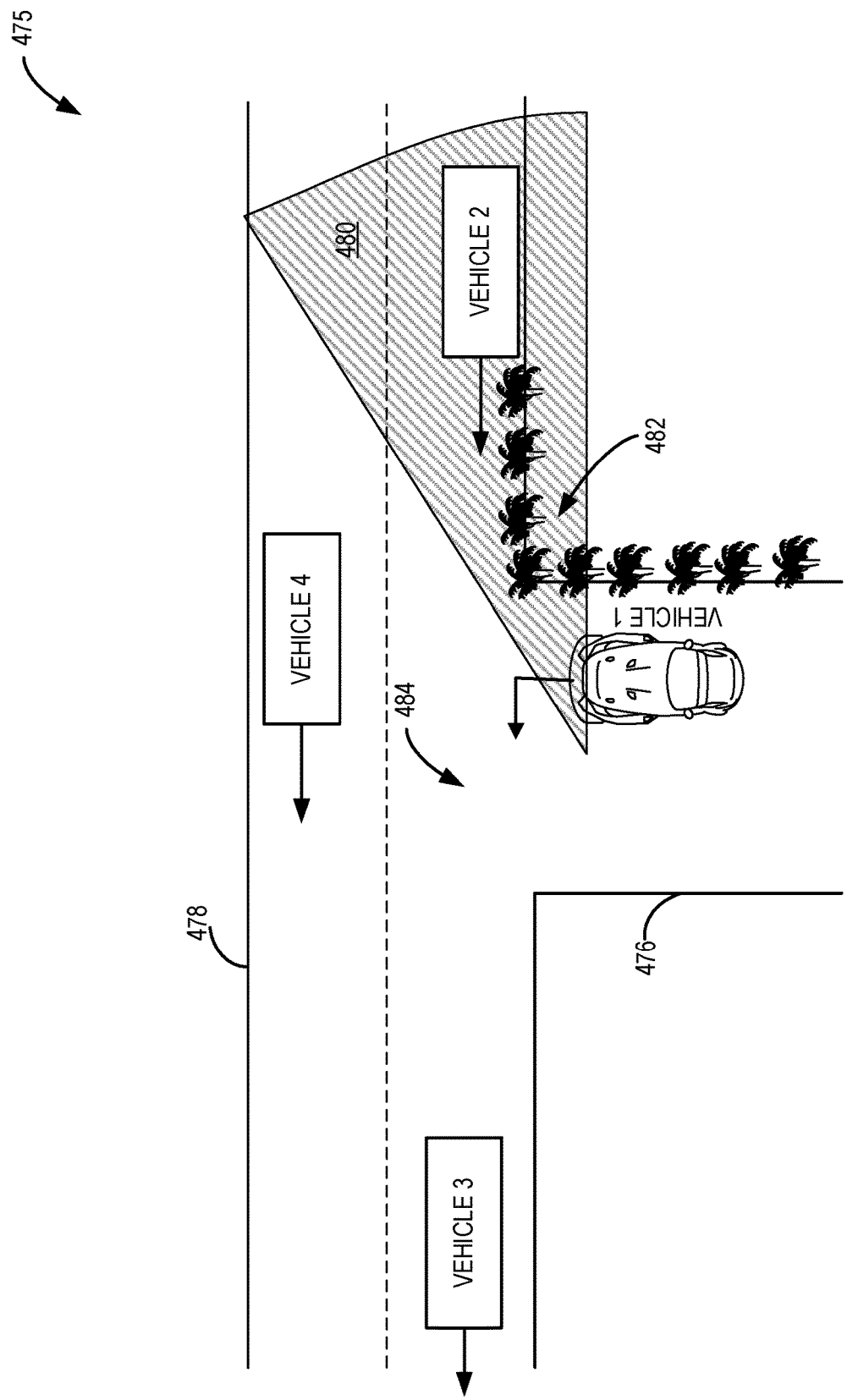

Another example scenario is shown in FIG. 4C. In scenario 475, the host vehicle (vehicle 1) is travelling towards a T-intersection 484 of a one-lane road 476 with a two-lane road 478. The driver of vehicle 1 may turn on the turn signal to indicate a left turn, by pushing up a turn-signal stalk, for example. In addition to the vehicle control input indicating a left turn, the view selector module may receive inputs from one or more of navigation subsystem and ego-motion estimation subsystem. Specifically, based on the map database (of the navigation subsystem or in the cloud server), the view selector module may determine that turning on the left turn indicator is not intended for changing lanes, but for making an actual left turn. In addition, based on the positioning sensor output, the view selector module may determine that vehicle 1 is slowly moving forward or stopped at the intersection 484. Accordingly, the surround view generator may generate a surround view 480 to point towards the left/forward quadrant, facing right for example. In the illustrated example, trees 482 lining along the sides of the road 476 and 478 may obstruct the view of the driver of vehicle 1. However, the surround view 480 generated by adjusting the virtual camera positon and viewing direction may not be blocked by the trees 482. Thus, the driver of vehicle 1 may be able to detect vehicle 2 in the path and thereby make the left turn once vehicle 2 has crossed the T-intersection 484. In one example, the objection detection sensor (such as radar/lidar sensor) may be able to detect vehicle 2 and further estimate the distance of vehicle 2 from vehicle 1. If the distance between vehicle 1 and vehicle 2 is less that a threshold distance, the surround view system may warn the driver of vehicle 1 about the possibility of colliding with vehicle 2. As such, the warning may be displayed on the display of the surround view system or may be displayed on a display of the in-vehicle computing system. However, if vehicle 2 is further away from the T-intersection (at a distance that is greater than the threshold distance), the surround view system may indicate to the driver of vehicle 1 that a left turn is possible.

The example scenarios described in FIGS. 4A-C, are example situations when the surround view is changed based on a turn signal being activated or detecting lane markings on the road via cameras positioned on the vehicle. However, the surround system may be able to generate a sequence of surround views based on a sequence of turns that is further based on a planned route, for example. As an example, a route may be mapped out by the navigation subsystem based on a destination input by the driver of vehicle 1. From the route, the view selector module may be able to determine ahead of time when and where the vehicle is likely to turn and, based on that determination, automatically adjust the surround view to point towards appropriate regions. For example, for vehicle 1 to travel from point A to point B, vehicle 1 has to travel along a one-way street heading towards a T-intersection, and then at the intersection, vehicle 1 has to make a right turn before arriving at point B. Based on the route information, the view selector module may be able to automatically adjust the surround view such that the surround view is facing forward until vehicle 1 reaches the T-intersection. At the intersection, the surround view may be automatically adjusted towards the left while vehicle 1 makes the right turn. In this way, the view selector module may be able to automatically adjust the surround view to select a virtual camera position that is most relevant to the driving situation.

As another example, the ego motion estimation subsystem may use data from the positioning sensor (e.g., movement of actuators) to estimate change in position of vehicle 1 over time (e.g., through devices such as rotary encoders to measure wheel rotations). For example, if the wheels are rotated towards the right by more than a threshold amount for a threshold time, the view selector module may determine that the vehicle is about to change from the left to the right lane, for example. In addition, the ego motion estimation subsystem may be able to determine conditions such as vehicle speed, whether vehicle is moving slowly forward, or stopped, and the like, and the view selector module may be able to predict the movement of the vehicle and accordingly change the surround view displayed to the driver.

The surround view system may generate a surround view such that a portion of the host vehicle appears in the image that is presented to the driver, thereby providing an intuitive way for the driver to gain spatial awareness and interpret the content of the image by providing the reference view of the host vehicle. The surround view system may further be able to assign threat scores of other vehicles in the vicinity of the host vehicle as described below.

Returning to FIG. 2, the surround view system 102 may include a threat score generator 230 that is operably coupled to one or more subsystems and modules of the surround view system 102. For example, the threat score generator 230 may receive input from the navigation subsystem 210, and the ego motion estimation subsystem 212, and additionally receive vehicle control input 214 to determine a position and a heading of the host vehicle. The threat score generator 230 may additionally receive input from the sensor subsystem 216. Specifically, one or more object detection sensors 217 positioned around the host vehicle may be able to detect vehicles surrounding the host vehicle. The threat score generator 230 may be able to generate a threat score for each of the vehicles surrounding the host vehicles based on the distance (as estimated by the object detection sensor 217) of each of the vehicles surrounding the host vehicles from the host vehicle. Additionally, the V2V communication system 218 may be able to establish connection with the other vehicles surrounding the host vehicle and determine a position, a heading, and a speed of each of the other vehicles.

The threat score generator 230 may be configured for generating and/or updating threat scores of the other vehicles within a threshold radius of the host vehicle. Threat scores may provide an indication of a likelihood of collision of the host vehicle with the other vehicles surrounding the host vehicle. The vehicle with a higher threat score may be identified as the most relevant threat vehicle. In one example, the threat score generator may identify the most relevant threat vehicle and report it to the view selector module 40. Based on the identified threat vehicle, the view selector module may adjust the virtual camera position such that the most relevant threat vehicle is in the surround view displayed to the driver of the host vehicle. In another example, the threat score generator 230 may assign each of the other vehicles surrounding the host vehicles a threat score, and report the threat score to the view selector module 40. In turn, the view selector module 40 may identify the most relevant threat vehicle as the vehicle with higher than threshold threat score and further adjust the virtual camera position to include the most relevant threat vehicle in the surround view.

In some examples, the threshold threat score may be determined by the threat score generator based on user input 220, driving conditions, and the like. Any vehicle with a threat score above the threshold may indicate that the vehicle poses an imminent threat of colliding with the host vehicle, whereas any threat score below the threshold may indicate that vehicle is not likely to collide with the host vehicle.

Figure 3:
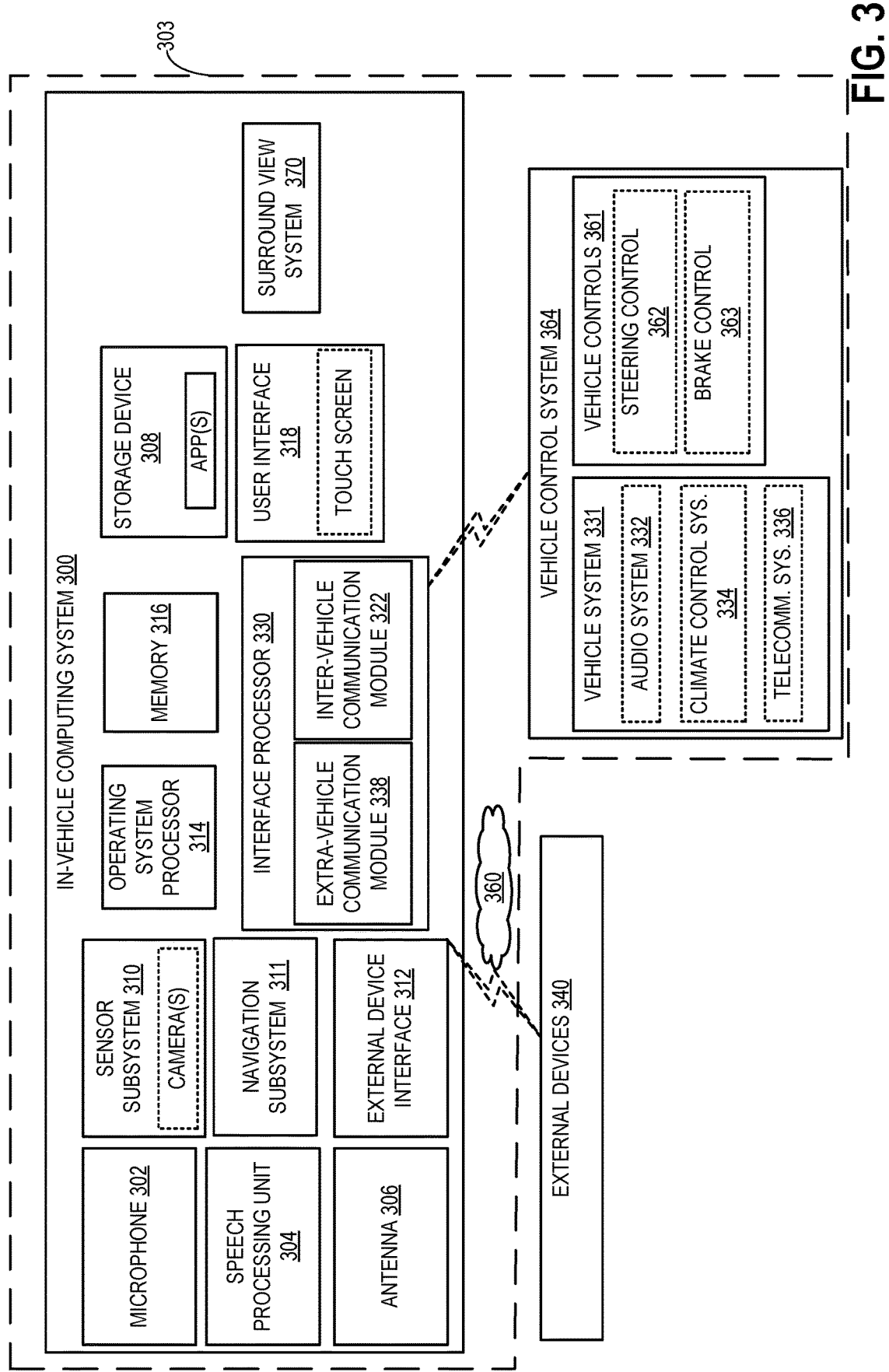
FIG. 3 shows a block diagram of an-vehicle computing system of the vehicle including the surround view system in accordance with one or more embodiments of the present disclosure.

Before proceeding to explain the threat scores in detail, it may be noted that the surround view system 102 may be a stand-alone system capable of generating and adjusting surround view based on driving situations that are inferred by the surround view system 102 based inputs received from the one or more subsystems of the surround view system 102. In some embodiments, the surround view system 102 may be part of an in-vehicle computing system of a vehicle as shown in FIG. 3. When included in the in-vehicle computing system, the surround view system may be able to share resources with the in-vehicle computing system to generate the surround view. For example, the surround view system may be able to receive inputs from one or more subsystems of the in-vehicle computing system as described below.

Turning now to FIG. 3, a block diagram of an in-vehicle computing system 300 is shown as configured and/or integrated inside vehicle 301 (hereafter referred to as host vehicle). The in-vehicle computing system 300 may perform one or more of the methods described herein in some embodiments. The in-vehicle computing system 300 may include several modules and systems that are adapted to communicate with each other and processor as well as the display, sensors of the in-vehicle computing system 300 and other vehicle systems of the host vehicle 303.

The in-vehicle computing system 300 may include a surround view system 370. The surround view system 370 may be an example of the surround view system 102 of FIGS. 1 and 2 and/or may perform one or more of the methods described herein in some embodiments. In additional or alternative examples, the surround view system 370 may be able to share resources from the in-vehicle computing system 300 to deduce the driving situation. For example, the surround view system 370 may receive inputs from one or more of sensor subsystem 310, navigation subsystem 311, and interface processor 330 of the in-vehicle computing system 300. In addition, the surround view system 370 may receive inputs from vehicle controls 361 of the in-vehicle computing system 300. The surround view system 370 may adaptively adjust the surround view displayed to the driver of the host vehicle 303 based on the inputs received. The in-vehicle computing system 300 of the host vehicle 303 is described in detail below.

The in-vehicle computing system 300 may include one or more processors including an operating system processor 314 and an interface processor 330. Operating system processor 314 may execute an operating system on the in-vehicle computing system, and control input/output, display, playback, and other operations of the in-vehicle computing system. In some example embodiments, the processor 314 may be capable of adjusting the surround view based on the driving situation as determined by the surround view system 370.

The sensor subsystem 310 of the in-vehicle computing system 300 may include sensors such as image sensors, positioning sensors, object positioning sensors, and the like. For example, the image sensors of the sensor subsystem 310 may include multiple cameras, such as a front camera, a left side camera, a right side camera, and a rear view camera. The surround view system 370 may be operably coupled to the multiple cameras of the sensor subsystem 310, and may generate a surround view of the host vehicle 30 by combining images received from at least two of the multiple cameras. For example, for generating a surround view towards the right/forward quadrant, facing left, the surround view system 370 may combine image data from the front camera and image data from the left side camera. Herein, the surround view may include a perspective right side view of the host vehicle 303.

Further, the sensor subsystem 310 of the in-vehicle computing system 300 may include object detection sensors such as radar sensors, lidar/ladar sensors, ultrasonic sensors, and the like. The surround view system 370 may detect vehicles and/or objects in the vicinity of the host vehicle 303 based on the in output of the object detection sensors, for example. As described previously, the surround view system 370 may be adjust the surround view based on vehicles and/or objects detected in the path of the host vehicle 303.

The sensor subsystem 310 of in-vehicle computing system 300 may communicate with and receive inputs from various vehicle sensors and may further receive user inputs. For example, the inputs received by sensor subsystem 310 may include transmission gear position, transmission clutch position, gas pedal input, brake input, transmission selector position, vehicle speed, engine speed, mass airflow through the engine, ambient temperature, intake air temperature, etc., as well as inputs from climate control system sensors, turn signals, etc. While certain vehicle system sensors may communicate with sensor subsystem 310 alone, other sensors may communicate with sensor subsystem 310, the vehicle control system 364, the surround view system 370, or may communicate with each of the systems indirectly via vehicle control system 364.

The navigation subsystem 311 of in-vehicle computing system 300 may generate and/or receive navigation information of the host vehicle 303 such as location information (e.g., via a GPS sensor and/or other sensors from sensor subsystem 310), route guidance, traffic information, point-of-interest (POI) identification, and/or provide other navigational services for the driver. The navigation subsystem 311 may additionally include a map database that may include information about road type, parking lot lane markings, curbs, traffic signs, traffic lights, pot holes, speed bumps and the like. The surround view system 370 may be able to communicate with the navigation subsystem 311 of the in-vehicle computing to determine the driving situation of the host vehicle 303.

Interface processor 330 may interface with a vehicle control system 364 via an inter-vehicle system communication module 322. In addition, the interface processor 330 may interface with other vehicles via an extra-vehicle communication module 338.

As such, the extra-vehicle communication module 338 may include a radio receiver capable of receiving information from in-vehicle computing systems of other vehicles in the vicinity of the host vehicle 303 via a wireless communication link (e.g., BLUETOOTH, WIFI/WIFI-direct, near-field communication, etc.). The surround view system 370 may be able to adjust the surround view based data received from the other vehicles. The data received may include a positon and a velocity (speed and heading, for example) of each of the other vehicles in the vicinity of the host vehicle 303.

Inter-vehicle system communication module 322 may output data to vehicle systems 331 and vehicle control elements 361, while also receiving data input from other vehicle components and systems 331, 361, e.g. by way of vehicle control system 364. When outputting data, inter-vehicle system communication module 322 may provide a signal via a bus corresponding to any status of the vehicle, the vehicle surroundings, or the output of any other information source connected to the vehicle. Vehicle data outputs may include for example, analog signals (such as current velocity), digital signals provided by individual information sources (such as clocks, thermometers, location sensors such as Global Positioning System [GPS] sensors, etc.), digital signals propagated through vehicle data networks (such as an engine controller area network [CAN] bus through which engine related information may be communicated, a climate control CAN bus through which climate control related information may be communicated, and a multimedia data network through which multimedia data is communicated between multimedia components in the vehicle). The surround view system 370 may be operably coupled to the inter-vehicle communication module 322 to receive the vehicle data output. For example, surround view system, 370 may retrieve from the engine CAN bus, the current speed of the vehicle as estimated by the wheel sensors, a power state of the vehicle via a battery and/or power distribution system of the vehicle, an ignition state of the vehicle, a, etc. In some example embodiments, the surround view system 370 may directly receive the vehicle data output from vehicle control system 364 via one or more methods described above with respect to the inter-vehicle communication module 322. In addition, other interfacing means such as Ethernet may be used as well without departing from the scope of this disclosure.

Vehicle control system 364 may also include controls for adjusting the settings of various vehicle controls 361 (or vehicle system control elements) related to the engine and/or auxiliary elements within a cabin of the vehicle, such as steering wheel controls 362 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc. For example, when the turn signal control is engaged to activate a right turn, the surround view system 370 may adjust the surround view based on the impending right turn as explained in FIG. 4A.

Vehicle controls 361 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system.

A non-volatile storage device 308 may be included in in-vehicle computing system 300 to store data such as instructions executable by processors 314 in non-volatile form. The one or more storage devices may store application data to enable the in-vehicle computing system 300 to run an application for connecting to a cloud-based server and/or collecting information for transmission to the cloud-based server. The application may retrieve information gathered by vehicle systems/sensors, input devices (e.g., user interface 318), devices in communication with the in-vehicle computing system (e.g., a mobile device connected via a Bluetooth link), etc. As an example, the information retrieved from the cloud server may be used by the surround view system 370 to determine driving situations as explained with reference to FIG. 2. Specifically, a map database (such as map database 211 of FIG. 2) may be retrieved from the cloud server. Based on the retrieved map database, the surround view system 370 may be able to determine a current location and a heading of the host vehicle. In addition, the map database may include information about the terrain/road types, road condition, traffic, and the like. As an example, based on the map database, the surround view system 370 may be able to deduce that the host vehicle 303 is on a single lane road at an intersection with a two-way lane street, and the like. As described previously, the map database may be generated by the surround view system 370, and may be generated and stored in the memory as explained below.

In-vehicle computing system 300 may include a volatile memory 316. Volatile memory 316 may be random access memory (RAM). Non-transitory storage devices, such as non-volatile storage device 308 and/or volatile memory 316, may store instructions and/or code that, when executed by a processor (e.g., operating system processor 314 and/or interface processor 330), controls the in-vehicle computing system 300 to perform one or more of the actions described in the disclosure. As an example, the volatile memory 316 may store instructions and codes that may adjust the surround view projected to the user of the host vehicle 303 based on one or more inputs received by the surround view system 370 of the in-vehicle computing system 300. Thus, based on data received from one or more subsystems of the in-vehicle computing system, the surround view system 370 may be able to adjust the surround view of displayed to the user of the host vehicle 303.

Some of the additional features of the in-vehicle computing system 300 are described below. The in-vehicle computing system 300 may include a microphone 302 and a speech processing unit 304 to receive voice commands from a user, to measure ambient noise in the vehicle, to determine whether audio from speakers of the vehicle is tuned in accordance with an acoustic environment of the vehicle, etc.

External device interface 312 of in-vehicle computing system 300 may be coupleable to and/or communicate with one or more external devices 340 located external to vehicle 301. Vehicle control system 364 may include controls for controlling aspects of various vehicle systems 331 involved in different in-vehicle functions. These may include, for example, controlling aspects of vehicle audio system 332 for providing audio entertainment to the vehicle occupants, aspects of climate control system 334 for meeting the cabin cooling or heating needs of the vehicle occupants, as well as aspects of telecommunication system 336 for enabling vehicle occupants to establish telecommunication linkage with others.

In-vehicle computing system 300 may further include an antenna 306. Antenna 306 is shown as a single antenna, but may comprise one or more antennas in some embodiments. The in-vehicle computing system may obtain broadband wireless internet access via antenna 306, and may further receive broadcast signals such as radio, television, weather, traffic, and the like. The in-vehicle computing system may receive positioning signals such as GPS signals via one or more antennas 306. The in-vehicle computing system may also receive wireless commands via RF such as via antenna (s) 306 or via infrared or other means through appropriate receiving devices. In some embodiments, antenna 306 may be included as part of audio system 332 or telecommunication system 336. Additionally, antenna 306 may provide AM/FM radio signals to external devices 340 (such as to mobile device 342) via external device interface 312.

One or more elements of the in-vehicle computing system 300 may be controlled by a user via user interface 318. User interface 318 may include a graphical user interface presented on a touch screen, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications/ systems of the in-vehicle computing system 300 such as the surround view system 370 via user interface 318. The surround view system 370 may receive a user's surround view preferences on user interface 318. Notifications and other messages (e.g., received messages), as well as navigational assistance, may be displayed to the user on a display of the user interface. User preferences/information and/or responses to presented messages may be performed via user input to the user interface.

As described previously, the surround view system may be able to adjust the surround view displayed to the user based on threat scores assigned to each of the other vehicles surrounding the host vehicle. Example scenarios are shown in FIGS. 5A-5D.

Figure 5A:
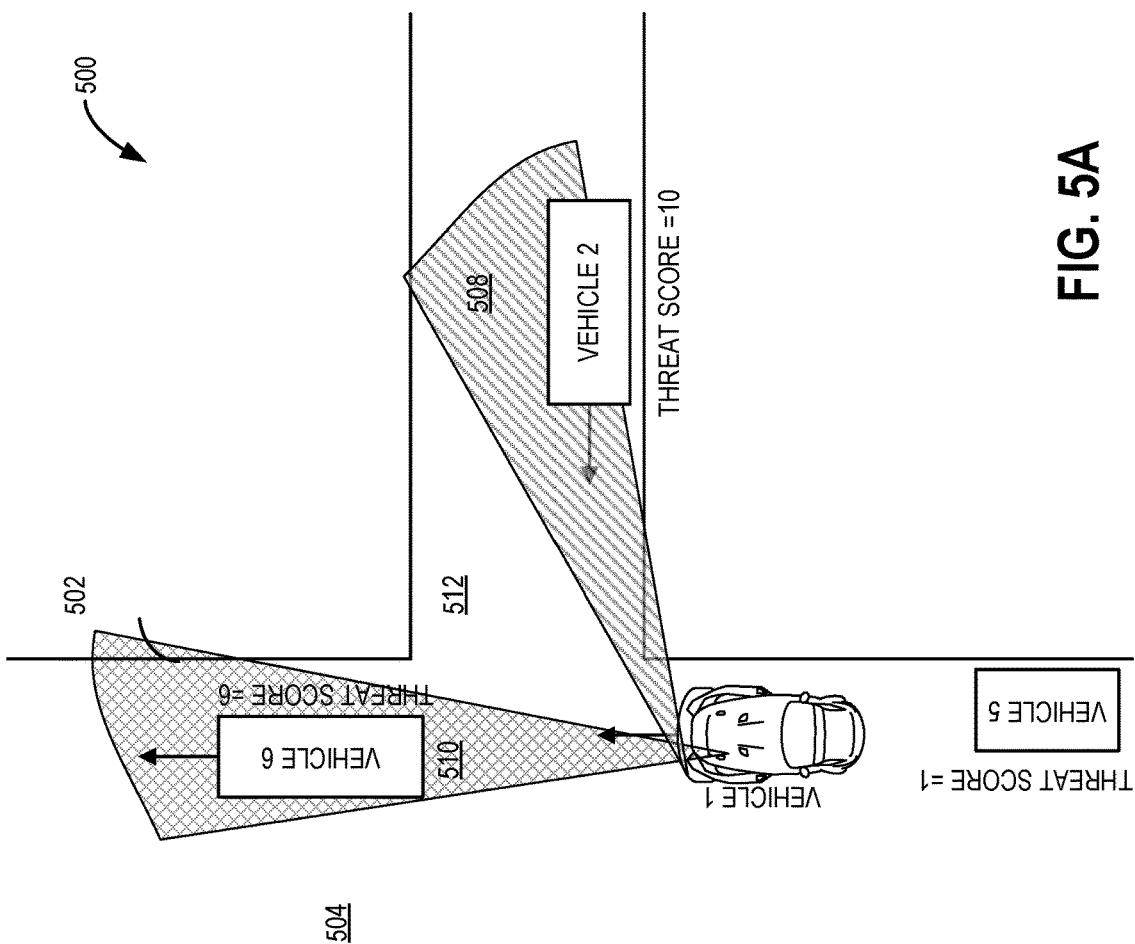
FIGS. 5A-C show example scenarios in which the virtual view of the surrounding the vehicle is adjusted based on identifying a relevant threat vehicle in the vicinity of the host vehicle based on threat scores, and/or predicted probability of collision in accordance with one or more embodiments of the present disclosure.

Turning to FIG. 5A, an example scenario 500 is shown. Specifically, the scenario 500 shows an example situation where threat scores are assigned to the other vehicles in the vicinity of the host vehicle (vehicle 1) based on a position, a heading, and a speed of the other vehicles relative to a position, a heading, and a speed of the host vehicle. As an example, the surround view system of the host vehicle may determine that the host vehicle is at a T-intersection traveling along lane 504 of road 502. As such, the location of the host vehicle may be determined based on the output of a GPS sensor and/or by looking up a map database of the navigation subsystem. In addition, based on outputs of one or more sensors such as positioning sensor, the surround view system may determine that the host vehicle is going to be travelling straight through the intersection at a certain speed.

Within a threshold distance around the host vehicle, five other vehicles may be detected. As such, the vehicles 2 through 6 may be detected by object detection sensors mounted on the host vehicles. Based on the output of the object detection sensors, a position, a velocity (e.g., heading and speed) of each of the vehicles 2 through 6 may be determined. In one example, the position, the heading, and the speed of each of the vehicles 2 through 6 may be received via V2V communication established between each of the vehicles 2 through 6 and the host vehicle. In such an example, the host vehicle may establish V2V communication with the in-vehicle computing system of each of the vehicles 2 through 6 and receive the position, the heading, and the location of each of the vehicles 2 through 6.

For each of the vehicles 2 through 6, a threat score may be assigned (by a threat score generator of the surround view system, for example). As such, the threat score may be indicative of a likelihood of collision of the other vehicles 2 through 6 with the host vehicle. For example, vehicle 5 may be detected to be behind the host vehicle. However, vehicle 5 may not be in motion but may be parked, for example. Hence vehicle 2 may be assigned a lower threat score (e.g., threat score=1).

Vehicles 3 and 4 may be detected to be travelling along lane 506 in a direction opposite to the direction of the host vehicle. Vehicle 3 may be travelling at a higher speed on located closer to the host vehicle, and hence may be assigned a higher threat score (e.g., threat score 5). However, vehicle 4 may be travelling on a bridge located above the road 502 (thus on a different height above sea level with respect to the host vehicle), and hence may be assigned a lower threat score (e.g., threat score=2).

Vehicle 6 may be determined to be travelling ahead of the host vehicle on lane 504, and vehicle 2 may be determined to be travelling towards the intersection along lane 512. When the host vehicle is at a threshold distance away from the intersection, vehicle 2 may be assigned a lower threat score than vehicle 6. For example, vehicle 2 may be assigned a threat score of 4 while vehicle 6 may be assigned a threat score of 6. As such, the threat scores of each of the vehicles 2 through 6 may be compared to a threshold threat score. Herein, the threshold threat score may be set to 5 based on driver input 220, driving conditions, and the like. Vehicle 6 has a threat score greater than the threshold threat score and thus, vehicle 6 may be identified as the most relevant threat vehicle. Based on the identification of the most relevant threat vehicle, the surround view system may adjust the surround view 510 such that the view 510 is pointing forward towards the relevant threat vehicle (herein vehicle 6).

However, as the host vehicle gets closer to the intersection, the threat scores of one or more vehicles in the vicinity of the host vehicle may be updated. As such, vehicle 2 may be assigned a higher threat score (e.g., threat score=10) and vehicle 2 may be identified as the most relevant threat vehicle. Vehicle 6 may be assigned a lower threat score (e.g., threat score=4). Therefore, the surround view system may update the surround view to include the most relevant threat vehicle. Thus, the updated surround view 508 may face right pointing towards vehicle 2. In this way, the surround view system may be able to adaptively update the threat score based on any changes to the driving condition. In another example, the surround view system may update the threat score if the position, heading, and the speed of the other vehicles changes with respect to the position, heading, and speed of the host vehicle.

Figure 5B:
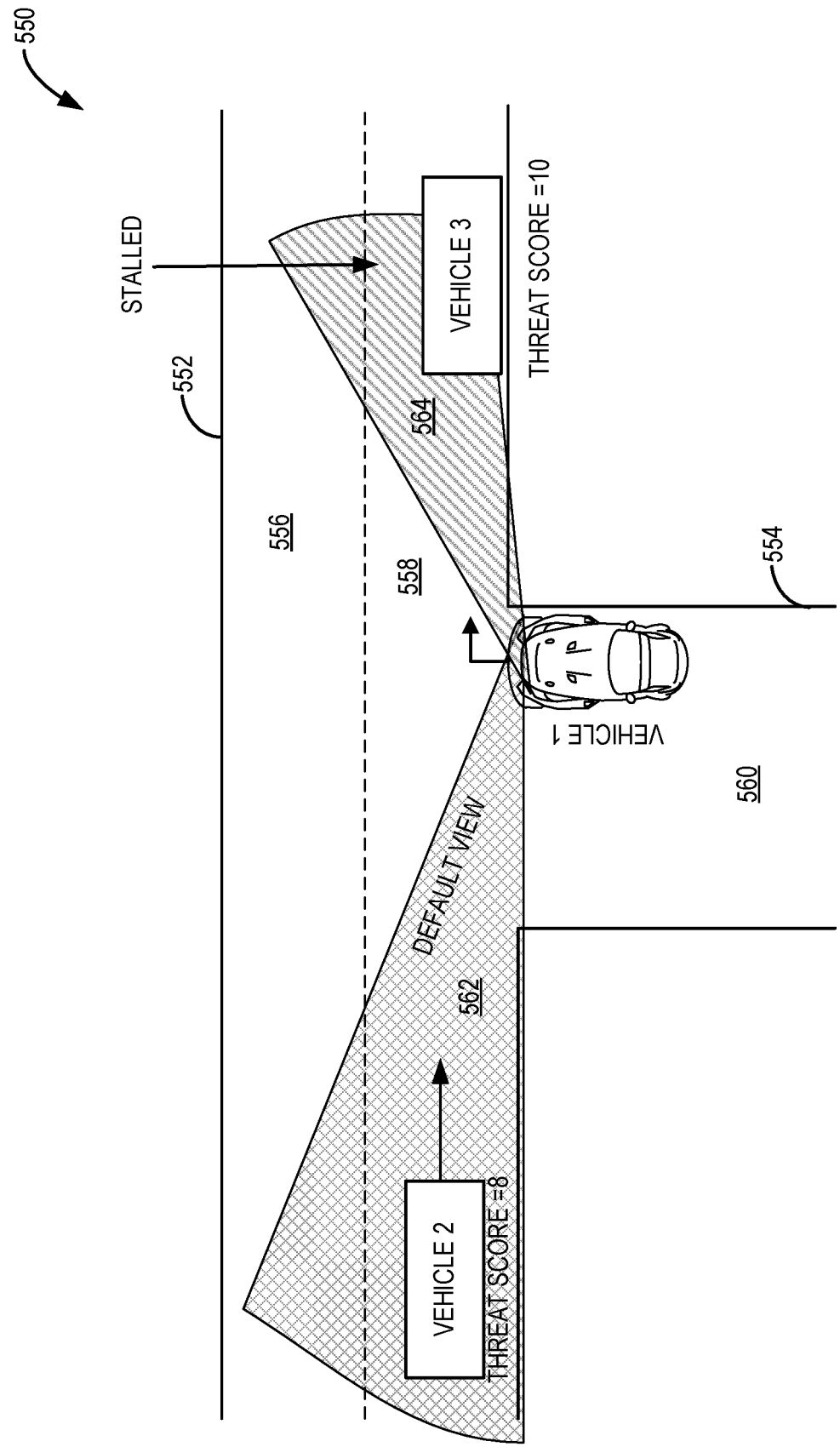

Another example scenario 550 is shown in FIG. 5B. Turning to FIG. 5B, the example scenario 550 shows that the host vehicle (vehicle 1) is stopped or moving slowly towards a T-intersection and is about to take a right turn. As explained previously with reference to FIG. 4A, the surround view system may be able to deduce that the host vehicle is at the T-intersection from the map database, and additionally infer that the host vehicle is about to make a right turn, based on the right turn indicator being activated, for example. Further, the positioning sensor may determine that the host vehicle is stopped or moving slowly towards the T-intersection.

Having determined that the host vehicle is about to make a right turn, the view selector module may accordingly generate a default surround view 562 to point towards the left of the two-lane road 552. In addition, the object detection sensors mounted on the host vehicle may be able to detect vehicle 2 and vehicle 3 located within a threshold distance from the host vehicle. The object detection sensors may further be able to determine a location and a velocity of vehicle 2 and vehicle 3. Alternatively, the location and the velocity of vehicle 2 and vehicle 3 may be received by the host vehicle by directly communicating with the in-vehicle computing system of the vehicles 2 and 3.

Vehicle 2 may be determined to be heading towards the T-intersection, and thus assigned a threat score of 8, for example. Vehicle 3 may be deemed to be less of a threat considering that vehicle 3 is moving away from the T-intersection, and thus may be assigned a lower threat score (e.g., threat score=4). Based on the threat scores, vehicle 2 may be identified as the most relevant threat vehicle and the default surround view 562 may be directed towards the left pointing at vehicle 2.

However, when the host vehicle is about to make the right turn, it may be determined that vehicle 3 is stalled on the right lane 558. As such, vehicle 3 may be right in the path of the host vehicle. Thus, the threat scores may be updated, and vehicle 3 may be assigned a higher threat score (e.g., threat score=10), vehicle 2 may be assigned a lower threat score (e.g., threat score=4). Based on the updated threat score, vehicle 3 may be identified as the most relevant threat vehicle 9 since the updated threat score of vehicle 3 is higher than the threshold threat score). Accordingly, an updated surround view 564 may be displayed to the driver of the host vehicle. The updated surround view 564 may be pointing to the right towards vehicle 3, for example. In this way, the surround view displayed to the driver of the host vehicle may be constantly updated based on the identified threat vehicle.

In some examples, the surround view system may map out paths or trajectories of each of the other vehicles surrounding the host vehicle in addition to mapping out the trajectory of the host vehicle. As such, the trajectories of each of the other vehicles may be computed based on the one or more of position, heading, and speed (received via V2V communication system or detected by sensors mounted on the host vehicle, for example). Likewise, the trajectory of the host vehicle may be computed based on estimating one or more of speed, location, and heading of the host vehicle. The surround view system may be able to identify one of the vehicles surrounding the host vehicle as the most relevant threat vehicle if the trajectory of the vehicle is likely to intersect with the trajectory of the host vehicle as shown in FIG. 5C.

Figure 5C:
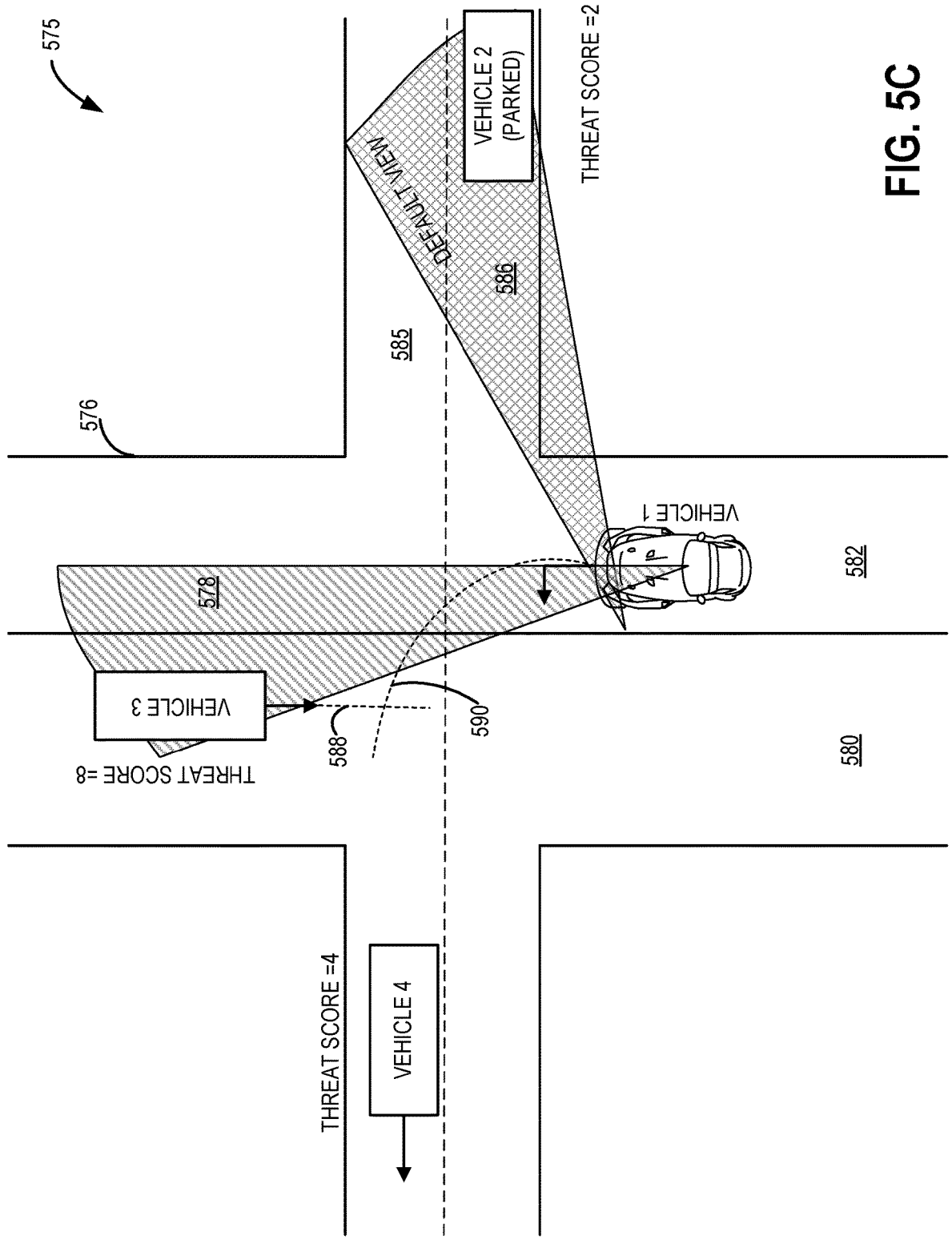

Turning now to FIG. 5C, an example scenario 575 shows the host vehicle (vehicle 1) at an intersection and about to make a left turn. As described previously, other vehicles surrounding the host vehicle may be detected based on object detection sensors mounted on the host vehicle, for example.

Based on the activation of a left turn signal in the host vehicle, the default surround view 586 may be adjusted towards the right facing towards vehicles in lane 586, for example. However, vehicle 2 in the lane 586 may be a parked vehicle (for example, the speed of vehicle 2 may be zero), and hence may be assigned a lower threat score (e.g., threat score=2) since vehicle 2 is not likely to be in the path of the host vehicle. Likewise, other vehicles in the vicinity of the host vehicle may be assigned threat scores based on the position and the velocity of the other vehicles relative to the position, the heading, and the speed of the host vehicle. Vehicle 4 may be detected to be travelling away from the intersection, and hence away from the host vehicle along lane 585. Thus, the host vehicle colliding with vehicle 4 may be less likely, and hence vehicle 4 may be assigned a lower threat score (e.g., threat score=4). Vehicle 3 may be approaching the intersection from an opposite direction on lane 580. The path or trajectory of vehicle 588 may be computed to be along dashed line 588. However, based on the speed and heading of the host vehicle, the trajectory of the host vehicle may be computed to be along dashed curve 590. Based on the computed trajectories, it may be determined that the trajectory 588 of vehicle 3 may collide with the trajectory 590 of the host vehicle. Accordingly, vehicle 3 may be assigned a higher threat score (e.g., threat score=8), and further identified as the most relevant threat vehicle. Hence, the surround view may be changed from the default view 586 facing right, to the updated surround view 578 facing forwards towards vehicle 3.

In this way, the surround view may be updated based on calculating a probability of collision of the host vehicle with the other vehicles in the vicinity of the host vehicle. Herein, the vehicle with a higher than threshold probability of collision with the host vehicle may be selected as the most relevant threat vehicle and the surround view may be accordingly updated.

Figure 6A:
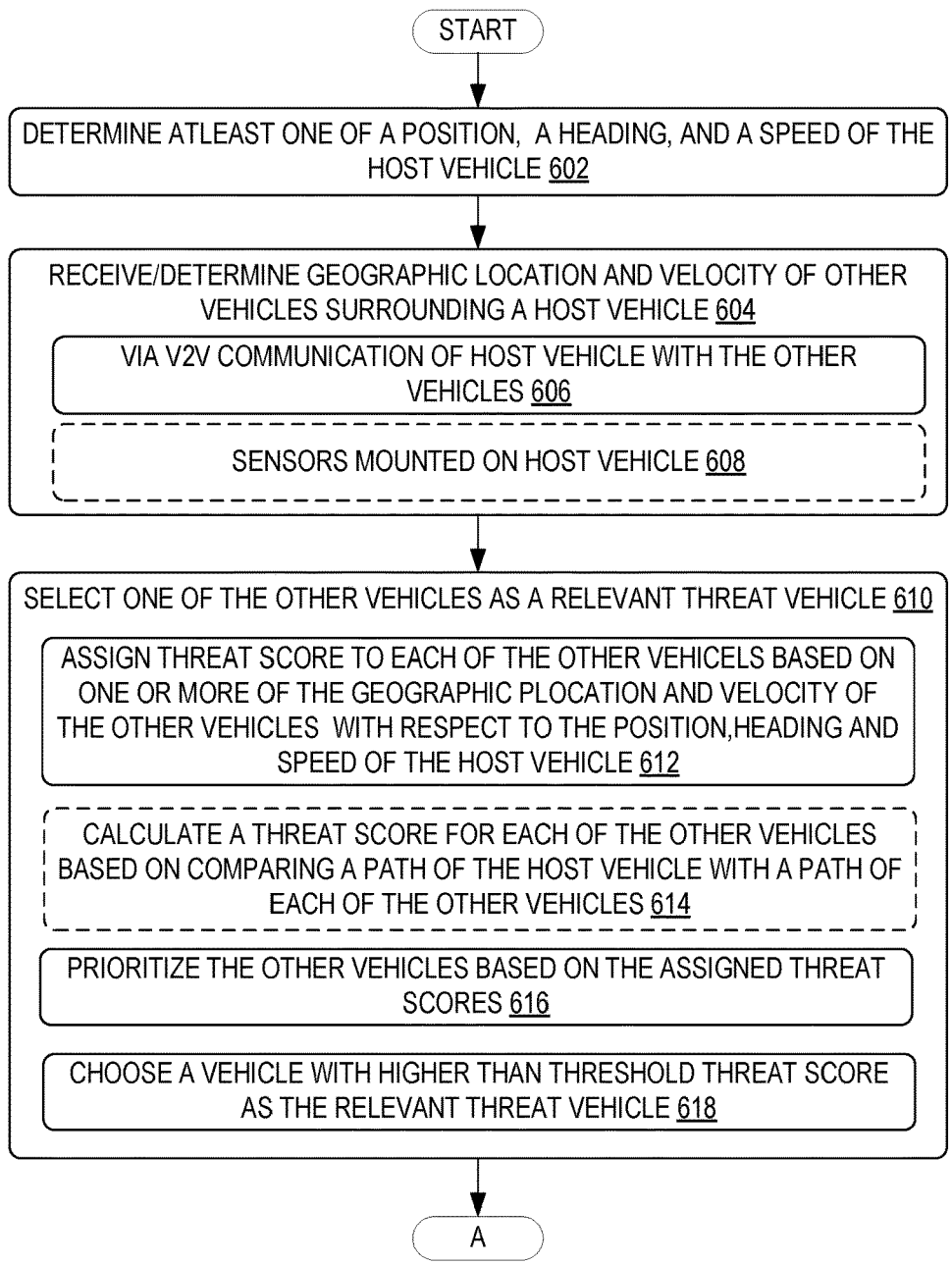
FIGS. 6A and 6B are flow charts of an example method for generating and updating threat scores of one or more vehicles surrounding the host vehicle in accordance with one or more embodiments of the present disclosure.
Figure 6B:
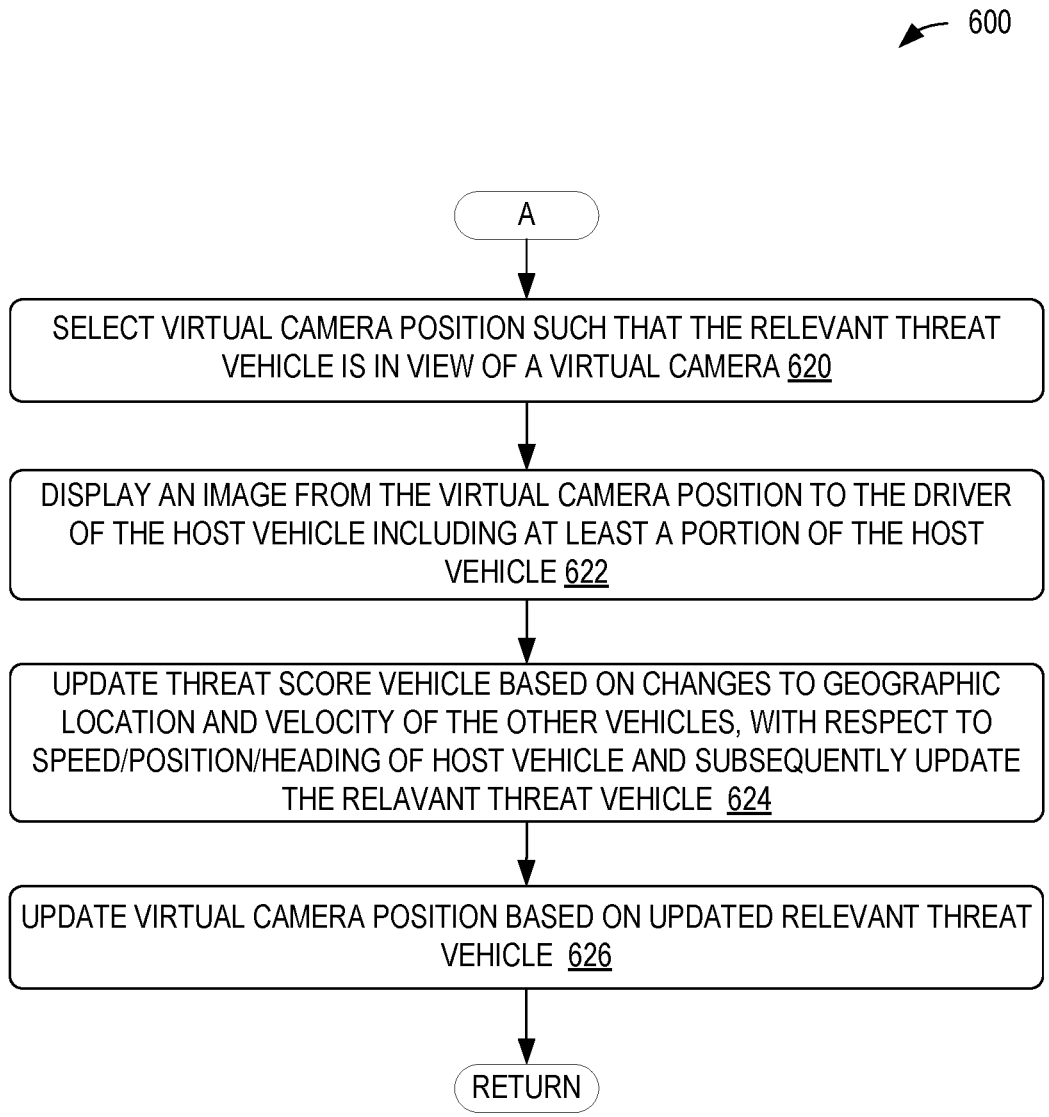

Turning to FIGS. 6A and 6B, an example method 600 is shown, as performed by a surround view system of a host vehicle for generating and updating threat scores of the one or more vehicles surrounding the host vehicle in accordance with one or more embodiments of the present disclosure. Specifically, the method includes automatically selecting a virtual camera position of the surround view system to point towards the most relevant threat vehicle. Method 600 may be performed by the surround view system (such as surround view system 102 of FIGS. 1 and 2, and/or surround view system 370 of FIG. 3). In some example embodiments, method 600 may be performed by an in-vehicle computing system (such as in-vehicle computing system 300 of FIG. 3) of the host vehicle.

Method 600 begins at 602 by determining at least one of a position, a heading, and a speed of the host vehicle. The position of the host vehicle may be determined from a GPS sensor and/or other sensors/cameras coupled to the host vehicle. In addition, the heading and the speed of the host vehicle may be determined based on the outputs of the positioning sensors such as accelerometers, gyroscopes, inclinometers, cameras, and the like. Method 600 then proceeds to 604. At 604, the method includes receiving/ determining geographic location and velocity of other vehicles surrounding the host vehicle. Receiving geographic location and velocity of the other vehicles surrounding the host vehicle may include receiving the location and velocity of the other vehicles via V2V communication established between the host vehicle and the other vehicles at 606. Alternatively, determining the location and velocity of the other vehicles may include determining the location and velocity of the other vehicles based on data generated by sensors on-board of the host vehicle at 608. Method 600 then proceeds to 610.

At 610, the method includes selecting one of the other vehicles as a relevant threat vehicle. Selecting one of the other vehicles as the relevant threat vehicle may include assigning threat scores to each of the other vehicles based on one or more of the geographic position and velocity of the other vehicles with respect to the position, the heading, and the speed of the host vehicle (as determined at 602) at 612. Alternatively, method 600 may include calculating a threat score for each of the other vehicles based on comparing a path or trajectory of the host vehicle with a path or trajectory of each of the other vehicles at 614. Selecting the relevant threat vehicle further includes prioritizing the other vehicles based on the assigned threat score at 616 and choosing a vehicle with higher than threshold threat score as the relevant threat vehicle at 618. As previously described, the threat scores indicate a likelihood of collision of the vehicle with the host vehicle. Thus, a vehicle with a higher threat score has a higher probability of colliding with the host vehicle than a vehicle with a lower threat score. Method 600 then proceeds to 620.

At 620, method 600 includes selecting a virtual camera positon such that the relevant threat vehicle is in view of a virtual camera. For example, if the relevant threat vehicle is to the left side of the host vehicle, the virtual camera positon may be selected to be in the right/forward quadrant, facing left towards the identified threat vehicle. Method 600 then proceeds to 622.

At 622, method 600 includes displaying an image from the virtual camera position to the driver of the host vehicle. As such, the image may include a portion of the host vehicle providing an intuitive way for the driver to gain spatial awareness and interpret the content of the image. As explained previously, the virtual camera position may combine data received from one or more real cameras (parts of the virtual camera position that are in view of the real camera) with virtual reality renderings of the host vehicle (which may include portions that are in a blind spot of the real cameras), for example. Method 600 proceeds to 624.

At 624, method 600 includes updating the threat score of the other vehicles based on changes to the geographic location and velocity of the other vehicles with respect to the location, heading, and speed of the host vehicle. Method 600 then proceeds to 626, where the virtual camera position is updated based on the updated relevant threat vehicle. Method 600 then returns.

In this way, the surround view may be automatically selected that is most relevant to a given driving condition. In addition, by identifying the relevant threat vehicle and projecting the surround view towards the identified threat vehicle, the attention of the driver of the host vehicle may be directed towards the threat vehicle. Based on the threat level, the driver may be able to take mitigating steps to avoid colliding with the threat vehicle. For example, the driver may be able to reduce the speed of the host vehicle, and/or change lanes to avoid a collision.

Figure 7A:
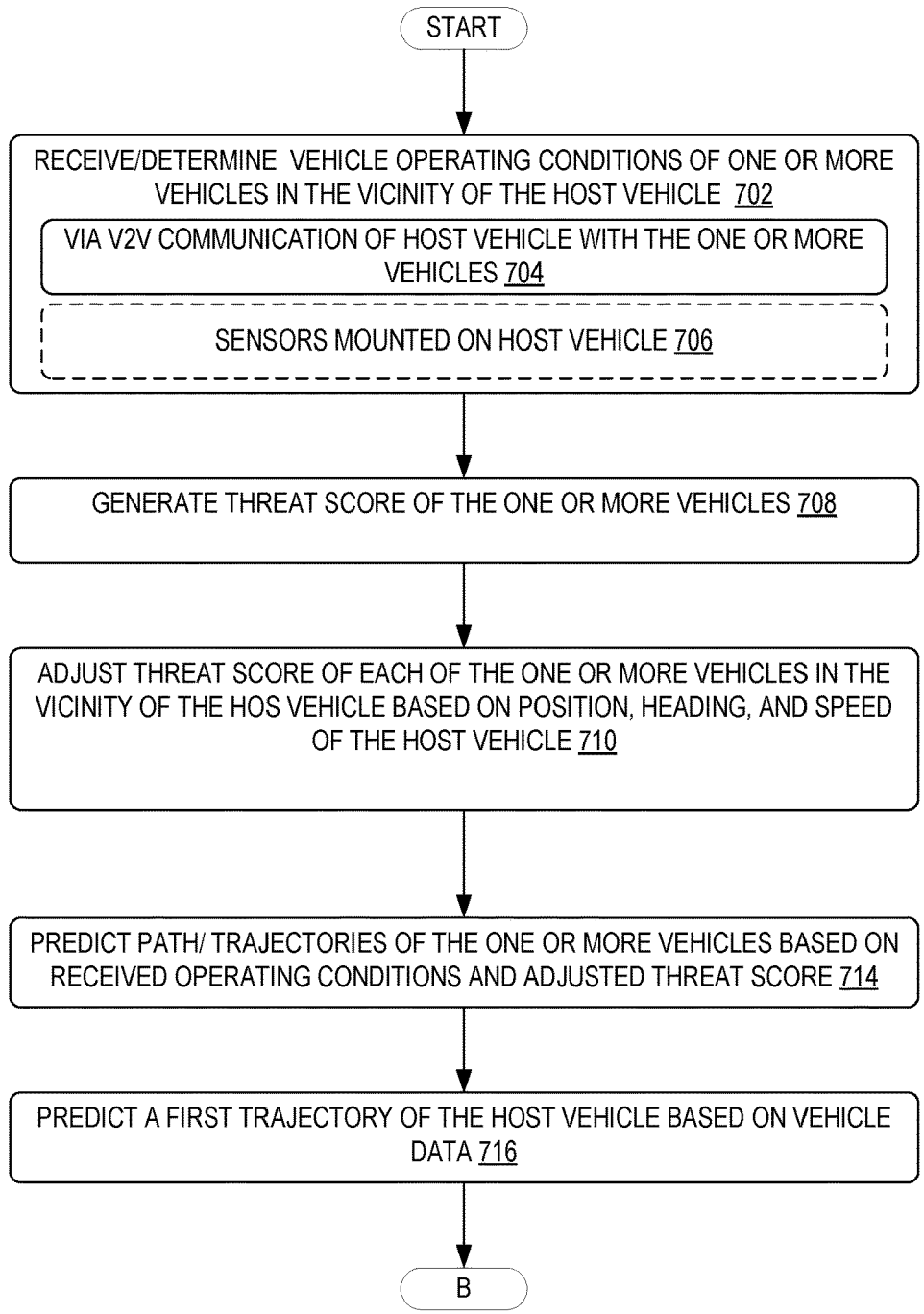
FIGS. 7A and 7B are flow charts of an example method for updating relevant threat vehicle based on a probability of collision of the threat vehicle with the host vehicle in accordance with one or more embodiments of the present disclosure.
Figure 7B:
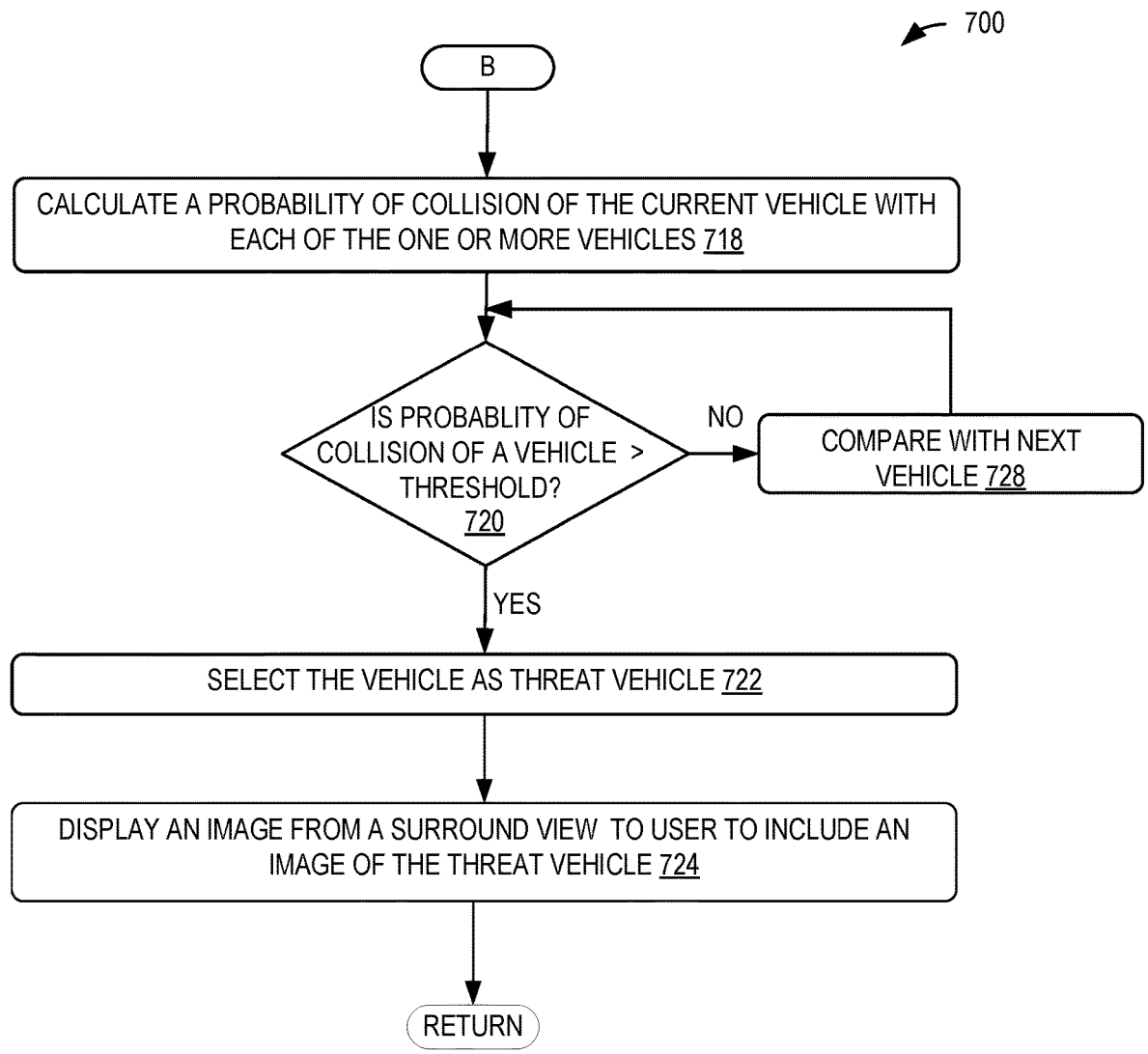

Turning now to FIGS. 7A and 7B, an example method is shown for selecting the relevant threat vehicle based on a probability of collision of the vehicle with the host vehicle in accordance with one or more embodiments of the present disclosure. Specifically, the method includes comparing trajectories of the host vehicle with the trajectories of the other vehicles in the vicinity of the host vehicle to determine the most relevant threat vehicle.

Method 700 begins at 702 by receiving/determining vehicle operating conditions of one or more vehicles in the vicinity of the host vehicle. The vehicle operating conditions may include a location, a heading, and a speed of the one or more vehicles. As such, receiving the vehicle operating conditions of the one or more vehicles may include receiving the position, the heading, and the speed of the one or more vehicles via V2V communication established between the host vehicle and the one or more vehicles at 704. Alternatively, determining the vehicle operating conditions of the one or more vehicles may include determining the position, the heading, and the speed of the one or more vehicles from sensors mounted on the host vehicle at 706. Method 700 then proceeds to 708.

At 708, method 700 includes generating a threat score of each of the one or more vehicles based on the vehicle operating conditioned received at 702. For example, if a vehicle speed is higher than a threshold speed, the vehicle may be assigned a higher threat score. Method 700 then proceeds to 710.

At 710, method 700 includes adjusting the threat score of each of the one or more vehicles based on a position, a heading, and a speed of the host vehicle. As explained previously, the position of the host vehicle may be determined based on outputs of a GPS sensor and/or other sensors/cameras coupled to the host vehicle; the heading and the speed of the host vehicle may be determined based on the outputs of the positioning sensors such as accelerometers, gyroscopes, inclinometers, cameras, and the like. Method 700 then proceeds to 714.

At 714, method 700 includes predicting paths/trajectories of the one or more vehicles based on the received/determined vehicle operating conditions and adjusted threat score. Method 700 then proceeds to 716.

At 716, method 700 includes predicting a first trajectory of the host vehicle based on vehicle data (e.g., heading, position, and speed) of the host vehicle. Next, method proceeds to 718. At 718, method 700 includes calculating a probability of collision of the host vehicle with each of the one or more vehicles in the vicinity of the host vehicle. The probability of collision of a vehicle with the host vehicle is higher (e.g., 0.7) if the trajectory of the vehicle intersects with the trajectory of the host vehicle. The probability of collision of the vehicle with the host vehicle is lower (e.g., 0.1) if the trajectories of the vehicle and the host vehicle do not intersect (or are asymptotic, for example). Method then 700 proceeds to 720.

At 720, method 700 includes determining if the probability of collision of a first vehicle of the one or more vehicles is higher than a threshold. The threshold may be determined based on an extent of overlap between trajectories, road condition, driving condition, brake condition, and the like. If the probability of collision of the first vehicle is higher than the threshold (e.g., "YES" at 720), then method 700 proceeds to 722 where the first vehicle is selected as the threat vehicle. However, if the probability of collision of the first vehicle is lower than the threshold (e.g., "NO" at 720), then method 700 proceeds to 728 where a second vehicle of the one or more vehicles is selected and the method returns to 720 where the probability of collision of the second vehicle with the first vehicle is compared with the threshold as explained previously at 720. Thus, method 700 includes performing the comparison for each of the one or more vehicles surrounding the host vehicle. For example, if there are five vehicles surrounding the host vehicle, the comparison of the probability of collision with the threshold (at 720) may be performed five times, for each of the vehicle of the five vehicles surrounding the host vehicle until the relevant threat vehicle is selected at 722. If two or more vehicles have probability of collision higher than the threshold, then the vehicle with the highest probability may be selected as the most relevant threat vehicle, and method 700 proceeds to 724.

At 724, method 700 includes displaying an image from a surround view to the driver/user of the host vehicle. As such, the surround view may be directed towards the threat vehicle, and the image may include an image of the threat vehicle. Method 700 then returns.

In this way, the surround view system may be able to automatically adjust the surround view to select a virtual camera position that is most relevant to the driving situation. In addition, by determining a threat vehicle in the vicinity of the host vehicle and additionally generating the surround view to point towards the threat vehicle, the driver's attention may be directed towards the threat vehicle in the path of the host vehicle and a collision may be averted. A technical effect of providing a view from a virtual camera position to the driver of the host vehicle is that view may be able to give an unobstructed view of the surrounding of the vehicle, thereby increasing spatial awareness. Another technical effect of the disclosure is that it offers an enhanced three dimensional surround view system that is capable of automatically selecting the virtual camera position that is most relevant to the driving situation.

The systems and methods described above provide for a method for automatically selecting a virtual camera position in a three-dimensional surround view system, the method comprising receiving a geographic position of other vehicles surrounding a host vehicle, selecting one of the other vehicles as a relevant threat vehicle based on at least one of a position, a heading, and a speed of the host vehicle relative to the geographic position of the other vehicles, selecting a virtual camera position such that the relevant threat vehicle and a portion of the host vehicle are in view of the virtual camera, and displaying an image from the virtual camera positon to a driver of the host vehicle. In a first example of the method, selecting the relevant threat vehicle may additionally or alternatively include selecting the relevant threat vehicle based on at least one of the position, the heading, and the speed of the host vehicle relative to a velocity of the other vehicles. A second example of the method optionally includes the first example, and further includes wherein selecting the relevant threat vehicle includes assigning a threat score to each of the other vehicles based on one or more of the geographic position, the velocity of the other vehicles relative to the position, the heading, and the speed of the host vehicle, the threat score being indicative of a likelihood of collision of the other vehicles with the host vehicle. A third example of the method optionally includes one or more of the first and the second example, and further includes wherein selecting the relevant threat vehicle further includes prioritizing the other vehicles based on the assigned threat score, and selecting as the relevant threat vehicle a vehicle from the other vehicles with greater than threshold threat score and adjusting vehicle operating conditions of the host vehicle based on the relevant threat vehicle. A fourth example of the method optionally includes one or more of the first through the third example, and further includes adaptively updating the threat score based on changes to any of the geographic position, and the velocity of the other vehicles relative to the position, the heading, and the speed of the host vehicle and subsequently updating the relevant threat vehicle. A fifth example of the method optionally includes one or more of the first through the fourth example, and further includes wherein updating the relevant threat vehicle includes updating the virtual camera position based on the updated relevant threat vehicle. A sixth example of method optionally includes one or more of the first through the fifth example, and further includes wherein selecting the relevant threat vehicle includes selecting based on the geographic position, and the velocity of the other vehicles received via a vehicle-to-vehicle communication established between the host vehicle and the other vehicles. A seventh example of method optionally includes one or more of the first through the sixth example, and further includes wherein selecting the relevant threat vehicle includes selecting based on the geographic position, and the velocity of the other vehicles received from a plurality of sensors located on the host vehicle.

The systems and methods described above also provide for a surround view system for a host vehicle, comprising a front camera, a left side camera, a right side camera, a rear camera, a display, a positioning sensor; and an image processing device operatively connected to the cameras and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the positioning sensor. In a first example of the surround view system, the system may additionally or alternatively includes a map database, wherein the default view is selected in response to on output of the positioning sensor and information stored in the map database. A second example of the surround view system optionally includes the first example, and further includes wherein the default virtual camera position is in front of and to right of a center of the host vehicle and wherein the viewing direction is facing left when the host vehicle is at an intersection and a right turn indicator is active. A third example of the surround system optionally includes one or more of the first and the second examples, and further includes wherein the default virtual camera position is in front of and to right of a center of the host vehicle and wherein the viewing direction is facing left when the host vehicle is in a right turn lane. A fourth example of the surround view system optionally includes one or more of the first through the third examples, and further includes wherein the default virtual camera position is in behind and to left of a center of the host vehicle and wherein the viewing direction is facing forward when the host vehicle is at an intersection and a left turn indicator is active. A fifth example of the surround view system optionally includes one or more of the first through the fourth examples, and further includes wherein the default virtual camera position is in behind and to left of a center of the host vehicle and wherein the viewing direction is facing forward when the host vehicle is at an intersection and host vehicle is in a left turn lane.

The systems and methods described above also provide for a surround view system for a host vehicle comprising one or more cameras, a display, an object detection sensor, and an image processing device operatively connected to the one or more cameras, the object detection sensor and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the object detection sensor. In a first example of the surround view system, the system may additionally or alternatively include wherein the one or more cameras are at least two cameras and wherein the default view combines images received from two of the at least two cameras.

The systems and methods described above also provide for a surround view system for a host vehicle, comprising one or more cameras, a display, a radio receiver; and an image processing device operatively connected to the one or more cameras, the radio receiver and to the display, wherein the image processing device is configured to generate a view having a viewing direction from a virtual camera position, the viewing direction and the virtual camera position being selected from a plurality of virtual camera positions and viewing directions, and wherein an image from a default view is displayed to a driver of the host vehicle, and wherein the viewing direction and virtual camera position of the default view are selected by the image processing device in response to an output of the radio receiver. In a first example of the surround view system, the system may additionally or alternatively includes a threat score generator capable of assigning threat scores to one or more vehicles surrounding the host vehicle based on the output of the radio receiver, and wherein the default view is adjusted in response to the generated threat score. A second example of the surround view system optionally includes the first example, and further includes assigning a higher threat score to one or more vehicles coming towards an intersection from a left side when the host vehicle is at the intersection and a right turn indicator of the host vehicle is active and adjusting the default virtual camera position to front of and to a right of a center of the host vehicle and pointing towards the one or more vehicles in the left side. A third example of the surround system optionally includes one or more of the first and the second examples, and further includes updating a threat score of a stalled vehicle detected on a right side of the intersection and adjusting the default virtual camera position to front of and to a left of a center of the host vehicle and pointing towards the stalled vehicle on the right side.

In another representation, the systems and methods described above provide for a vehicle system of a current vehicle, the vehicle system comprising a vehicle-to-vehicle communication system configured to receive vehicle operating conditions of one or more vehicles in a vicinity of the current vehicle, a threat score generator configured to generate a threat score for each of the one or more vehicles based on the received vehicle operating conditions relative to a vehicle data of the current vehicle, a surround view generator configured to generate a synthesized image based on image data received from multiple sensors mounted on the current vehicle, a processor; and a storage device storing instructions executable by the processor to: automatically select a virtual viewing angle of the synthesized image based on the received vehicle operating conditions and the threat score; and display an image to a user at the selected virtual viewing angle, the image including the synthesized image and an image of at least a portion of the current vehicle. In a first example of the vehicle system, the system may additionally or alternatively include wherein the vehicle operating conditions comprises a location, a speed, and a heading of the one or more vehicles. A second example of the vehicle system optionally includes the first example, and further includes a driver assistance system, and wherein the instructions are further executable to: adjust the threat score based on the vehicle data of the current vehicle received from the driver assistance system, the driver assistance system including a plurality of subsystems, the driver assistance system being capable of determining map location, sensing ego motion, and anticipating turn based on outputs of the plurality of subsystems. A third example of the vehicle system optionally includes one or more of the first and the second examples, and further includes wherein the instructions are further executable to predict trajectories of each of the one or more vehicles based on the received operating conditions and the adjusted threat score, and predict a first trajectory of the current vehicle based on the vehicle data. A fourth example of the vehicle system optionally includes one or more of the first through the third examples, and further includes wherein the instructions are further executable to: calculate a probability of collision of the current vehicle with each of the one or more vehicles based on the predicted trajectories intersecting with the predicted first trajectory of the current vehicle, and select a vehicle from the one or more vehicles with a higher than threshold probability of collision as a threat vehicle. A fifth example of the vehicle system optionally includes one or more of the first through the fourth examples, and further includes wherein the instructions are further executable to update the image displayed to the user, updating including updating the viewing angle of the synthesized image to include the threat vehicle.

In yet another representation, the systems and methods described above provide for an advanced driver assistance system of a current vehicle, the advanced driver assistance system comprising a surround view generator configured to generate a virtual view by adjusting a virtual camera position, a processor; and a storage device storing instructions executable by the processor to: responsive to determining that a road segment includes a lane with an upcoming intersection, and a speed of the current vehicle is below a threshold speed, anticipate an impending right turn based on a turn signal of the current vehicle, select the virtual camera position towards a left direction, generate the virtual view from the virtual camera position, and display the virtual view to a driver of the current vehicle. In a first example of the driver assistance system, the system may additionally or alternatively include wherein the instructions are further executable to: responsive to detecting a stalled vehicle in the right turn along a path of the current vehicle, assigning a higher threat score to the stalled vehicle; and automatically adjusting the virtual camera position towards a right direction pointing towards the stalled vehicle. A second example of the driver assistance system optionally includes the first example, and further includes a sensor sub-system communicatively coupled to a plurality of sensors, wherein the instructions are further executable to detect the stalled vehicle in the path of the current vehicle based on outputs of the plurality of sensors. A third example of the driver assistance system optionally includes one or more of the first and the second examples, and further includes wherein the plurality of sensors include one or more of an image sensor, a radar sensor, and a vision sensor. A fourth example of the driver assistance system optionally includes one or more of the first through the third examples, and further includes wherein the instructions are further executable to detect the stalled vehicle in the path of the current vehicle based on traffic data. A fifth example of the driver assistance system optionally includes one or more of the first through the fourth examples, and further includes a navigation subsystem, and wherein the instructions are further executable to anticipate the impending right turn based on a driver input.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the in-vehicle computing system 300 described with reference to FIG. 3 and/or surround view system 102 described with reference to FIGS. 1 and 2, and/or surround view system 370 described with reference to FIG. 3 in combination with view selector module 40 and/or image processing device 20 described with reference to FIG. 2. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for automatically selecting a virtual camera position in a three-dimensional surround view system, the method comprising:
receiving a geographic position of other vehicles surrounding a host vehicle;
selecting one of the other vehicles as a relevant threat vehicle based on at least one of a position, a heading, and a speed of the host vehicle relative to the geographic position of the other vehicles;
selecting a virtual camera position such that the relevant threat vehicle and a portion of the host vehicle are in view of the virtual camera; and
displaying an image from the virtual camera positon to a driver of the host vehicle.

2. The method of claim 1, wherein selecting the relevant threat vehicle includes selecting the relevant threat vehicle based on at least one of the position, the heading, and the speed of the host vehicle relative to a respective velocity of the other vehicles.

3. The method of claim 2, wherein selecting the relevant threat vehicle includes assigning a threat score to each of the other vehicles based on one or more of the geographic position and the velocity of the other vehicles relative to the position, the heading, and the speed of the host vehicle, the threat score being indicative of a likelihood of collision of the other vehicles with the host vehicle.

4. The method of claim 3, wherein selecting the relevant threat vehicle further includes prioritizing the other vehicles based on the assigned threat score, and selecting as the relevant threat vehicle a vehicle from the other vehicles with greater than a threshold threat score and adjusting vehicle operating conditions of the host vehicle based on the relevant threat vehicle.

5. The method of claim 3, further comprising adaptively updating the threat score based on changes to any of the geographic position and the velocity of the other vehicles relative to the position, the heading, and the speed of the host vehicle and subsequently updating the relevant threat vehicle.

6. The method of claim 5, wherein updating the relevant threat vehicle includes updating the virtual camera position based on the updated relevant threat vehicle.

7. The method of claim 3, wherein selecting the relevant threat vehicle includes selecting based on the geographic position and the velocity of the other vehicles received via a vehicle-to-vehicle communication established between the host vehicle and the other vehicles.

8. The method of claim 3, wherein selecting the relevant threat vehicle includes selecting based on the geographic position, and the velocity of the other vehicles received from a plurality of sensors located on the host vehicle, and wherein the other vehicles comprise at least two other vehicles.

9. A surround view system for a host vehicle, comprising:
a front camera;
a left side camera;
a right side camera;
a rear camera;
a display;
a positioning sensor;
a vehicle control input configured to indicate whether a vehicle right turn indicator is active or a vehicle left turn indicator is active;
a map database; and
an image processing device operatively connected to the cameras and to the display, wherein the image processing device is configured to generate a view having a viewing direction from a virtual camera position, the viewing direction and the virtual camera position being selected from a plurality of virtual camera positions and viewing directions, wherein an image from a default view is displayed to a driver of the host vehicle, wherein a viewing direction and a virtual camera position of the default view are selected by the image processing device in response to an output of the positioning sensor and an output of the vehicle control input, and wherein the default view is selected in response to an output of the positioning sensor and information stored in the map database.

10. The surround view system as in claim 9, wherein the default virtual camera position is in front of and to right of a center of the host vehicle and wherein the viewing direction is facing left when the host vehicle is at an intersection and the vehicle control input indicates the right turn indicator is active.

11. The surround view system as in claim 9, wherein the default virtual camera position is in front of and to right of a center of the host vehicle and wherein the viewing direction is facing left when the host vehicle is in a right turn lane.

12. The surround view system as in claim 9, wherein the default virtual camera position is behind and to left of a center of the host vehicle and wherein the viewing direction is facing forward when the host vehicle is at an intersection and the vehicle control input indicates the left turn indicator is active.

13. The surround view system as in claim 9, wherein the default virtual camera position is behind and to left of a center of the host vehicle and wherein the viewing direction is facing forward when the host vehicle is at an intersection and host vehicle is in a left turn lane.

14. A surround view system for a host vehicle, comprising:
one or more cameras;
a display;
a radio receiver; and
an image processing device operatively connected to the one or more cameras, the radio receiver, and the display, wherein the image processing device is configured to generate a view having a viewing direction from a virtual camera position, the viewing direction and the virtual camera position being selected from a plurality of virtual camera positions and viewing directions, wherein an image from a default view is displayed to a driver of the host vehicle, wherein the viewing direction and virtual camera position of the default view are selected by the image processing device in response to an output of the radio receiver, wherein the radio receiver is configured to receive information from other vehicles via a wireless communication link, and wherein the viewing direction and virtual camera position of the default view are selected by the image processing device in response to the information from the other vehicles received by the radio receiver.

15. The surround view system as in claim 14, wherein the one or more cameras are at least two cameras and wherein the default view combines images received from two of the at least two cameras.

16. The surround view system as in claim 14, further comprising a threat score generator capable of assigning threat scores to one or more vehicles surrounding the host vehicle based on the output of the radio receiver, and wherein the default view is adjusted in response to the generated threat score.

17. The surround view system as in claim 16, further comprising assigning a higher threat score to one or more vehicles coming towards an intersection from a left side when the host vehicle is at the intersection and a right turn indicator of the host vehicle is active and adjusting the default virtual camera position to front of and to a right of a center of the host vehicle and pointing towards the one or more vehicles in the left side.

18. The surround view system as in claim 17, further comprising updating a threat score of a stalled vehicle detected on a right side of the intersection and adjusting the default virtual camera position to front of and to a left of a center of the host vehicle and pointing towards the stalled vehicle on the right side.

* * * * *